(12) United States Patent
Nakao et al.

(10) Patent No.: US 11,232,906 B2
(45) Date of Patent: Jan. 25, 2022

(54) FILM CAPACITOR, COMBINATION TYPE CAPACITOR, AND INVERTER AND ELECTRIC VEHICLE EMPLOYING THE SAME

(71) Applicant: KYOCERA Corporation, Kyoto (JP)

(72) Inventors: Yoshihiro Nakao, Kirishima (JP); Kousei Kamigaki, Kirishima (JP)

(73) Assignee: Kyocera Corporation, Kyoto (JP)

( * ) Notice: Subject to any disclaimer, the term of this patent is extended or adjusted under 35 U.S.C. 154(b) by 93 days.

(21) Appl. No.: 16/755,902

(22) PCT Filed: Jun. 4, 2019

(86) PCT No.: PCT/JP2019/022134
§ 371 (c)(1),
(2) Date: Apr. 14, 2020

(87) PCT Pub. No.: WO2020/084823
PCT Pub. Date: Apr. 30, 2020

(65) Prior Publication Data
US 2021/0217558 A1 Jul. 15, 2021

(30) Foreign Application Priority Data
Oct. 26, 2018 (JP) .............................. JP2018-201991

(51) Int. Cl.
*H01G 4/06* (2006.01)
*H01G 4/005* (2006.01)
(Continued)

(52) U.S. Cl.
CPC .............. *H01G 4/06* (2013.01); *H01G 4/005* (2013.01); *H01G 4/224* (2013.01); *H01G 4/30* (2013.01); *H01G 4/38* (2013.01); *H02M 7/5387* (2013.01)

(58) Field of Classification Search
CPC .......... H01G 4/30; H01G 4/012; H01G 4/015; H01G 4/18; H01G 4/32; H01G 4/06;
(Continued)

(56) References Cited

U.S. PATENT DOCUMENTS 5,339,068 A * 8/1994 Tsunoda .................. H01C 1/02
338/308
2008/0130198 A1 6/2008 Nakano et al.
(Continued)

FOREIGN PATENT DOCUMENTS

JP 09-129475 A 5/1997
JP 2002-353067 A 12/2002
(Continued)

*Primary Examiner* — Michael P McFadden
(74) *Attorney, Agent, or Firm* — Volpe Koenig

(57) ABSTRACT

A film capacitor includes: a main body portion including dielectric films and metal films which are laminated; external electrodes; and an insulating layer disposed on a surface of the main body portion. The main body portion includes a pair of first faces, a pair of first side faces and a pair of second side faces, the first side faces and the second side faces connecting the first faces. The external electrodes are disposed on the first side faces, respectively. The metal films each include a plurality of first segments into which the metal films are divided by a plurality of first grooves extending in a first direction. The insulating layer is disposed between the main body portion and parts of the external electrodes within first regions which are regions of the first side faces that are distant from the second side faces, respectively, by a distance of P or less.

19 Claims, 20 Drawing Sheets

(51) Int. Cl.
*H01G 4/224* (2006.01)
*H01G 4/30* (2006.01)
*H01G 4/38* (2006.01)
*H02M 7/5387* (2007.01)

(58) Field of Classification Search
CPC .......... H01G 4/005; H01G 4/224; H01G 4/38;
H02M 7/5387
See application file for complete search history.

(56) References Cited

U.S. PATENT DOCUMENTS

| 2015/0255217 | A1* | 9/2015 | Nishiyama | ............... | H02P 27/06 |
| | | | | | 318/400.3 |
| 2016/0055974 | A1* | 2/2016 | Kojima | .................... | H01G 4/10 |
| | | | | | 361/301.4 |
| 2017/0047166 | A1* | 2/2017 | Saito | ...................... | H01G 4/015 |

FOREIGN PATENT DOCUMENTS

| JP | 2007-096158 A | 4/2007 |
| JP | 2016-009775 A | 1/2016 |
| JP | 2017-098495 A | 6/2017 |
| WO | 99/00807 A1 | 1/1999 |
| WO | 2014/178134 A1 | 11/2014 |

* cited by examiner

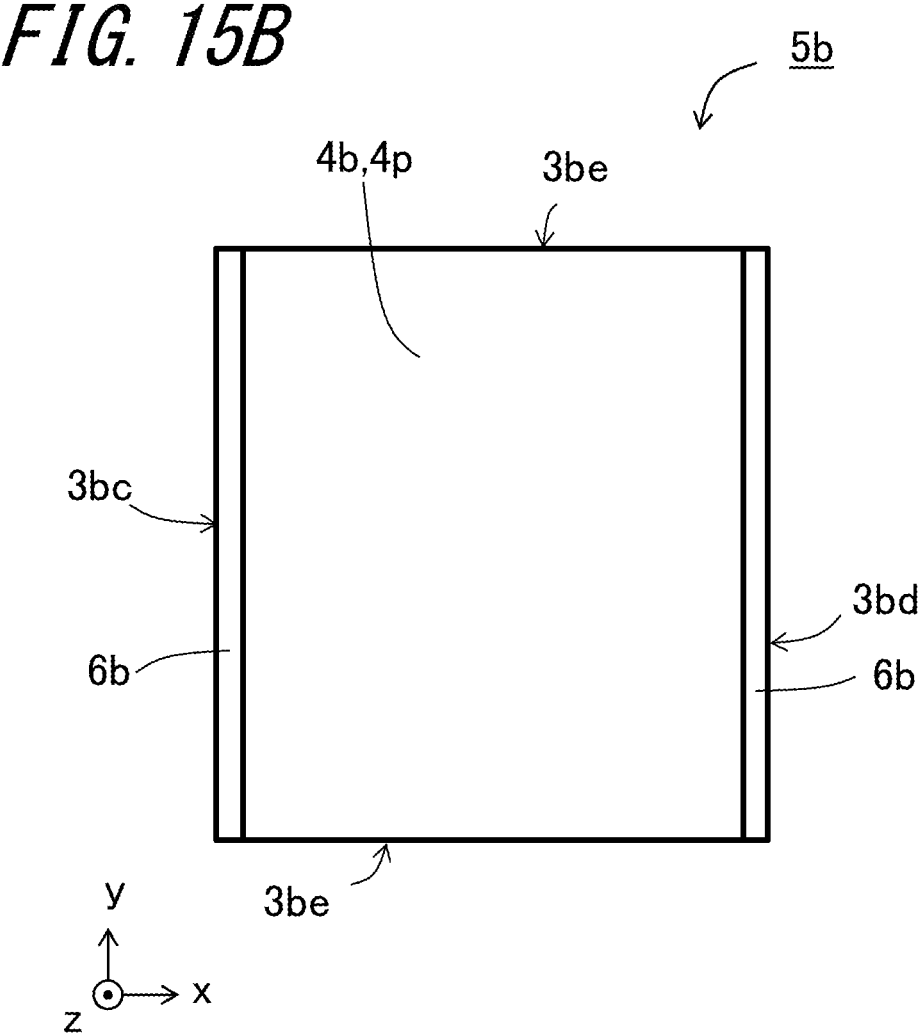

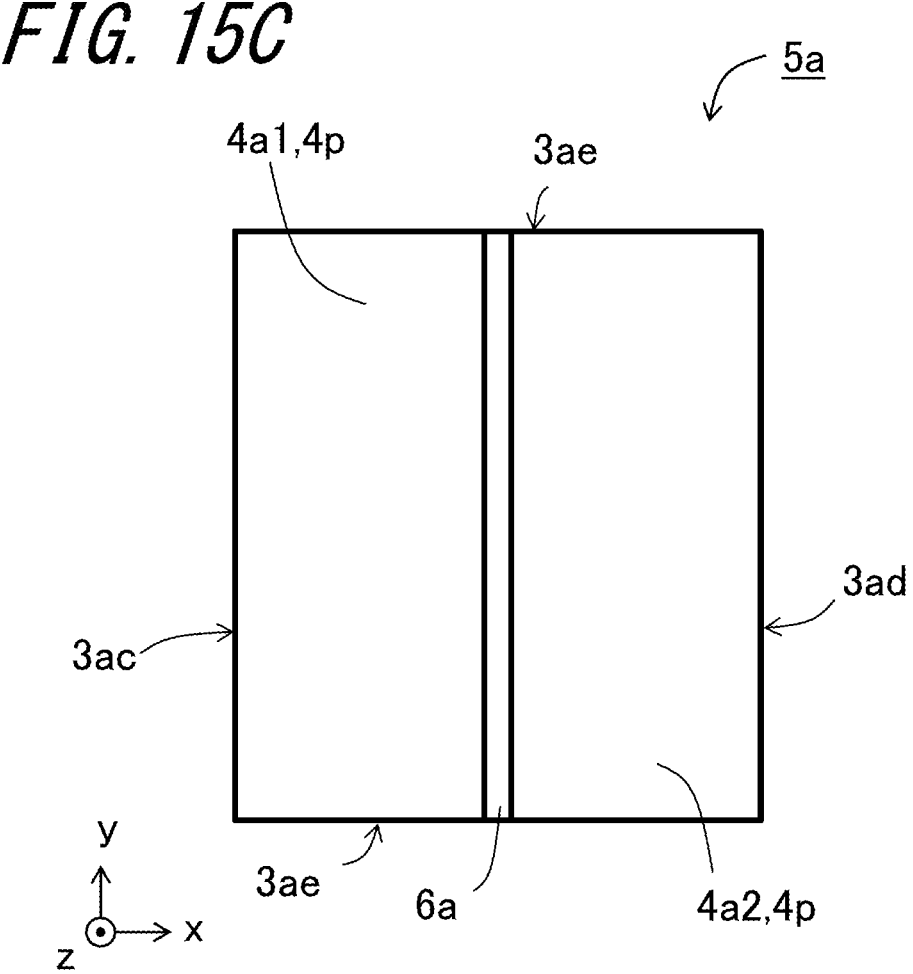

US 11,232,906 B2

FILM CAPACITOR, COMBINATION TYPE CAPACITOR, AND INVERTER AND ELECTRIC VEHICLE EMPLOYING THE SAME

CROSS-REFERENCE TO RELATED APPLICATIONS

This application is a national stage entry according to 35 U.S.C. 371 of International Application No. PCT/JP2019/022134, filed on Jun. 4, 2019, which claims priority to Japanese Patent Application No. 2018-201991, filed on Oct. 26, 2018, the contents of which are entirely incorporated herein by reference.

TECHNICAL FIELD

The present disclosure relates to a film capacitor, a combination type capacitor, and an inverter and an electric vehicle employing the capacitor.

BACKGROUND

For example, a film capacitor includes a dielectric film made of polypropylene resin in film-like form, and a metal film formed on a surface of the dielectric film by vapor deposition. The metal film is used as an electrode. In the film capacitor thus constructed, in the event of electrical short-circuiting occurring at an insulation defect point in the dielectric film, the metal film lying around the defect point is volatilized for release by short-circuiting-induced energy, with the consequent attainment of insulation in the insulation defect point of the dielectric film. The film capacitor having such a self-healing capability is resistant to dielectric breakdown (for example, refer to Japanese Unexamined Patent Publication JP-A 9-129475 (1997) (Patent Literature 1)).

With its resistance to troubles such as ignition or electric shock that arise due to electrical short-circuiting occurring in an electric circuit, the film capacitor has recently been put to an increasingly wider range of uses, including application to a power circuit for LED (Light Emitting Diode) illumination, etc., application to motorized drive for a hybrid car, and application to an inverter system for photovoltaic power generation.

Film capacitors are classified as wound type capacitors, and laminated type capacitors. A laminated type capacitor is less prone to problems associated with a wound type capacitor, such as occurrence of crease in a dielectric film and a decline in insulation caused by the crease. Unfortunately, the laminated type capacitor is typically obtained by cutting a laminate including a plurality of dielectric films and metal films, and thus, the metal film is cut concurrently with the cutting of the laminate, causing insulation degradation resulting from the exposure of the cut surface of the metal film. Japanese Unexamined Patent Publication JP-A 2007-96158 (Patent Literature 2) discloses a way of removing a metal film at a location of cutting for reducing cutting-caused insulation degradation.

SUMMARY

A film capacitor according to the disclosure includes: a main body portion shaped in a rectangular prism, including dielectric films and metal films which are laminated; a pair of external electrodes; and an insulating layer disposed on a surface of the main body portion. The main body portion includes a pair of first faces which are opposite to each other in a laminating direction of the main body portion, and a pair of first side faces which are opposite to each other and a pair of second side faces which are opposite to each other, the pair of first side faces and the pair of second side faces connecting the pair of first faces. The external electrodes are disposed on the first side faces, respectively. When a positional direction of the first side faces is defined as a first direction and a positional direction of the second side faces is defined as a second direction, the metal films each have a plurality of first segments into which the metal films are divided by a plurality of first grooves extending in the first direction. An interval between two grooves of the plurality of first grooves which are arranged adjacent to each other and are nearest the second side faces is designated as P. When regions of the first side faces that are distant from each of the second side faces, respectively, by a distance of less than or equal to P are defined as first regions, the insulating layer is disposed between the main body portion and the external electrodes within the first regions. Alternatively, the insulating layer is disposed at an area of the first side faces spaced away from the second side faces, respectively, by a distance equal to P, and, the external electrodes are not disposed in the first regions.

An inverter according to the disclosure includes: a bridge circuit including switching elements; and a capacitance member connected to the bridge circuit, the capacitance member including the film capacitor described above.

An electric vehicle according to the disclosure includes: a power supply; the inverter according to the disclosure, connected to the power supply; a motor connected to the inverter; and wheels driven by the motor.

BRIEF DESCRIPTION OF DRAWINGS

FIG. 15B is a plan view showing an example of one of the metallized films of the construction shown in FIG. 2B;

FIG. 15C is a plan view showing an example of the other one of the metallized films of the construction shown in FIG. 2B;

DETAILED DESCRIPTION

Figure 1:
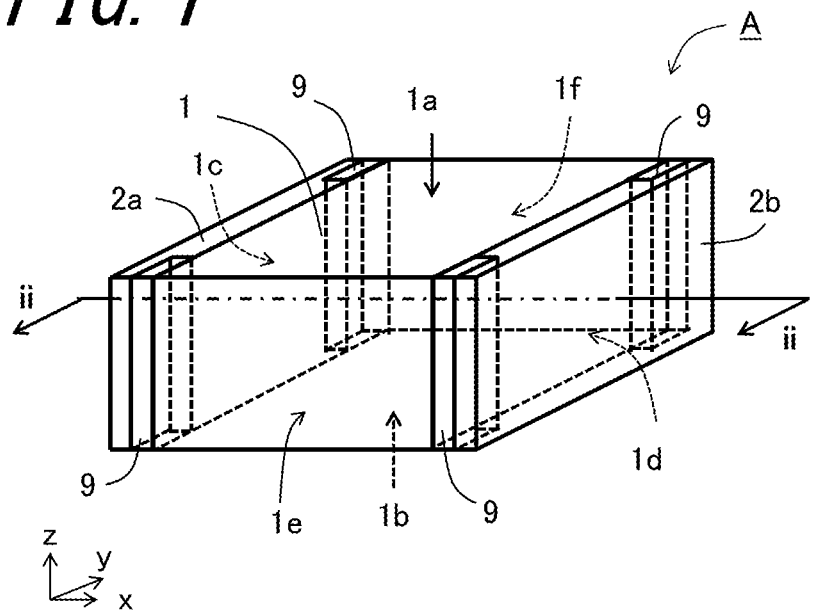
FIG. 1 is a perspective view schematically showing a laminated type film capacitor.
Figure 2A:
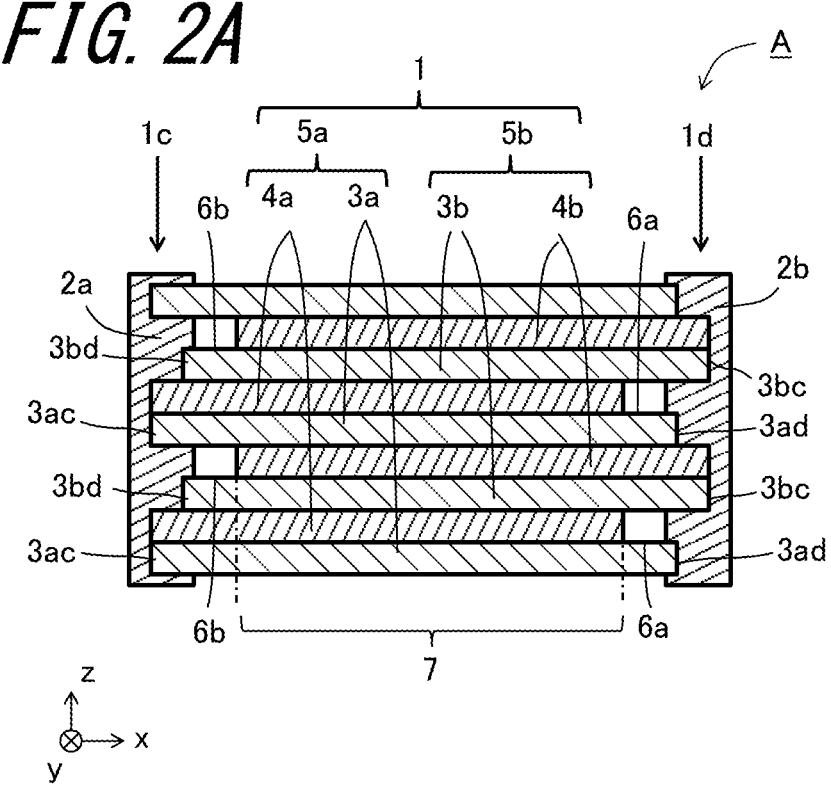
FIG. 2A is a sectional view showing an example of the laminated type film capacitor taken along the line ii-ii in FIG. 1.
Figure 2B:
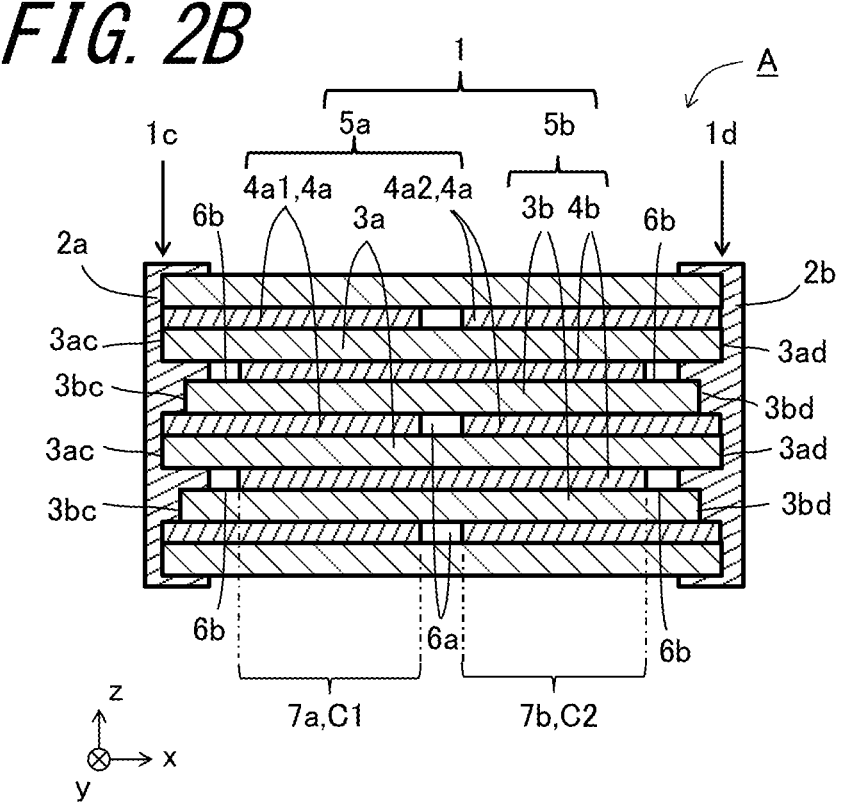
FIG. 2B is a sectional view showing another example of the laminated type film capacitor taken along the line ii-ii in FIG. 1.

As shown in FIG. 1, a laminated type film capacitor A includes a film capacitor main body portion 1 and a pair of external electrodes 2a and 2b. The film capacitor main body portion 1 may also be hereinafter called merely "main body portion 1". FIG. 2A is a sectional view of one example of the film capacitor A taken along the line ii-ii in FIG. 1, and, FIG. 2B is a sectional view of another example of the film capacitor A taken along the line ii-ii in FIG. 1. In the main body portion 1, a plurality of rectangular dielectric films 3a and 3b and a plurality of rectangular metal films 4a and 4b are alternately laminated as shown in FIGS. 2A and 2B.

The main body portion 1 is shaped in a rectangular prism including a pair of first faces 1a and 1b opposed to each other in a laminating direction of the dielectric films and the metal films, i.e., a laminating direction z, and a pair of first side faces 1c and 1d and a pair of second side faces 1e and 1f lying between the first face 1a and the first face 1b so as to be connected between the first faces 1a and 1b. The main body portion 1 is obtained by cutting the laminate including a plurality of dielectric films and a plurality of metal films. The second side faces 1e and 1f are cut surfaces of the laminate.

In each drawing to be referred to, the relative sizes of the individual constituent components are exaggerated for purposes of illustration, and the actual thickness of each component is thus very small relatively to the dimensions of the main body portion.

The main body portion 1 is provided at the first side face 1c with the external electrode 2a, and is provided at the first side face 1d with the external electrode 2b. As shown in FIGS. 2A and 2B, the external electrodes 2a and 2b may partly cover the first faces 1a and 1b of the main body portion 1, respectively.

As shown in FIG. 1, an arrangement direction of the external electrode 2a and the external electrodes 2b is defined as a first direction x, and an arrangement direction of the second side face 1e and the second side face 1f is defined as a second direction y. A direction z corresponds to the thickness direction of the dielectric films 3a and 3b and the metal films 4a and 4b, i.e., the laminating direction.

Figure 3A:
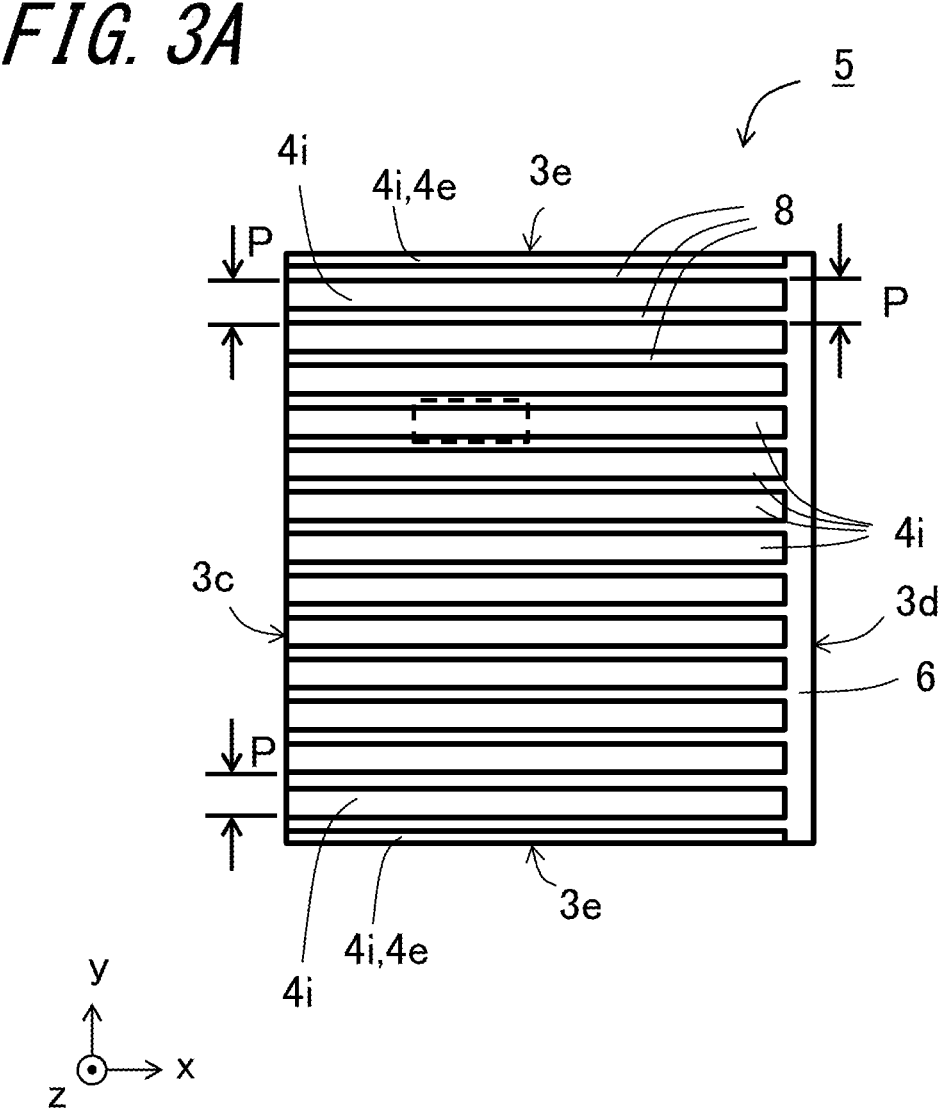
FIG. 3A is a plan view showing an example of a metallized film of the construction shown in FIG. 2A.

The following description deals with such characteristics as are common to the dielectric film 3a and the dielectric film 3b, as well as such characteristics as are common to the metal film 4a and the metal film 4b, and hence, for example, as shown in FIG. 3A, the reference letters a and b may be omitted from the following description. Moreover, in each sectional view, the section of each film in the thickness direction z is shown to an enlarged scale to facilitate explanation of the construction.

In the main body portion 1 shown in FIG. 2A, metallized films 5a each including the metal film 4a disposed on one side of the dielectric film 3a, and metallized films 5b each including the metal film 4b disposed on one side of the dielectric film 3b are alternately laminated. The metal film 4a is electrically connected to the external electrode 2a at the first side face 1c of the main body portion 1. The metal film 4b is electrically connected to the external electrode 2b at the first side face 1d of the main body portion 1.

In the metallized film 5a, the metal film 4a is formed on one side of the dielectric film 3a. In the metallized film 5b, the metal film 4b is formed on one side of the dielectric film 3b. As shown in FIG. 2A, the metallized film 5a and the metallized film 5b are disposed so as to be displaced in relation to each other in a width direction thereof, i.e., the first direction x, and thus, in the main body portion 1, each of the first side faces 1c and 1d includes an offset area free of an overlap of the metallized film 5a and the metallized film 5b.

Thus, in one example of the film capacitor A, the metallized films 5a each including the dielectric film 3a and the metal film 4a, and the metallized films 5b each including the dielectric film 3b and the metal film 4b are laminated as shown in FIG. 2A. The main body portion 1 may additionally include a cover film disposed outside the laminate including the metallized films 5a and the metallized films 5b.

The metal film 4a is electrically connected to the external electrode 2a at the first side face 1c located at one of the opposite ends of the main body portion 1 in the first direction x, and the metal film 4b is electrically connected to the external electrode 2b at the first side face 1d located at the other end of the main body portion 1 in the first direction x.

A potential difference between the metal film 4a and the metal film 4b causes capacitance in an effective region 7 where the metal film 4a and the metal film 4b are overlapped with each other, with the dielectric film 3 lying between them.

The dielectric film 3 includes a first end 3c located on one side in the first direction x thereof, a second end 3d located on the other side in the first direction x thereof, and third ends 3e located on each side in the second direction y thereof. In proximity to the second end 3d, there is provided an insulation margin 6 in the form of a continuous portion extending in the second direction y. The insulation margin 6 is an area where the dielectric film 3 is left bare of the metal film. The insulation margin 6 may be hereinafter called merely "margin 6".

As shown in FIG. 3A, the metal film 4 is divided into a plurality of first segments 4i by a plurality of first grooves 8 extending in the first direction x. The bottom of the first groove 8 is constituted by the dielectric film 3. The first groove 8 is a continuous groove extending from the first end 3c of the dielectric film 3 to the margin 6.

Figure 3B:
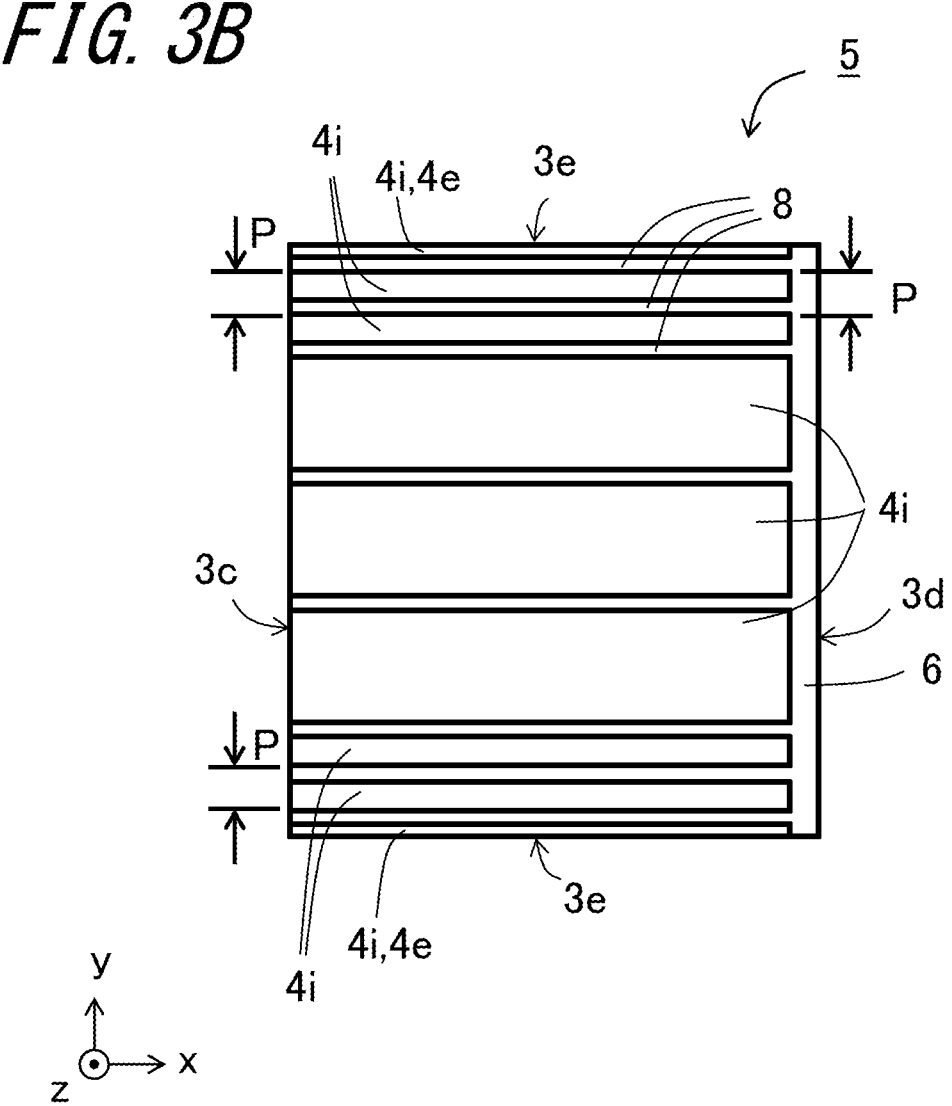
FIG. 3B is a plan view showing another example of the metallized film of the construction shown in FIG. 2A.

In the metal film 4, the first grooves 8 may be arranged so that intervals between adjacent first grooves 8 are all equal, or alternatively, some or all of the first grooves 8 may be arranged at varying intervals. Note that the interval between two adjacent first grooves 8 may be hereinafter called merely "interval between the first grooves 8". The interval between the first grooves 8 is equal to the sum of the width of a single first segment 4i and the width of a single first groove 8 in the second direction y, and is thus greater than the width of a single first segment 4i. For the first grooves 8 arranged at varying intervals, the interval between the first grooves 8 may be equal to the sum of the width of a single first segment 4i and the average of the widths of two first grooves 8 including the single first segment 4i sandwiched in between. The interval between two grooves of the first grooves 8 which are arranged adjacent each other and are nearest the second side face 1e or the second side face 1f, is designated as P. For the first grooves 8 arranged nearly equidistantly, the average interval between adjacent first grooves 8 may be designated as P. For example, P falls in the range of 0.5 mm or more and 20 mm or less. As shown in FIG. 3B, the interval between other adjacent first grooves 8 than the two first grooves 8 nearest the second side face 1e, 1f may be greater than P.

The first segment 4i contiguous to each of the second side faces 1e and 1f of the main body portion 1 is defined as an end metal film 4e. Note that the values of interval, length, width, thickness, etc. are each given as an average value in the following description unless otherwise specified.

First Embodiment

Figure 4:
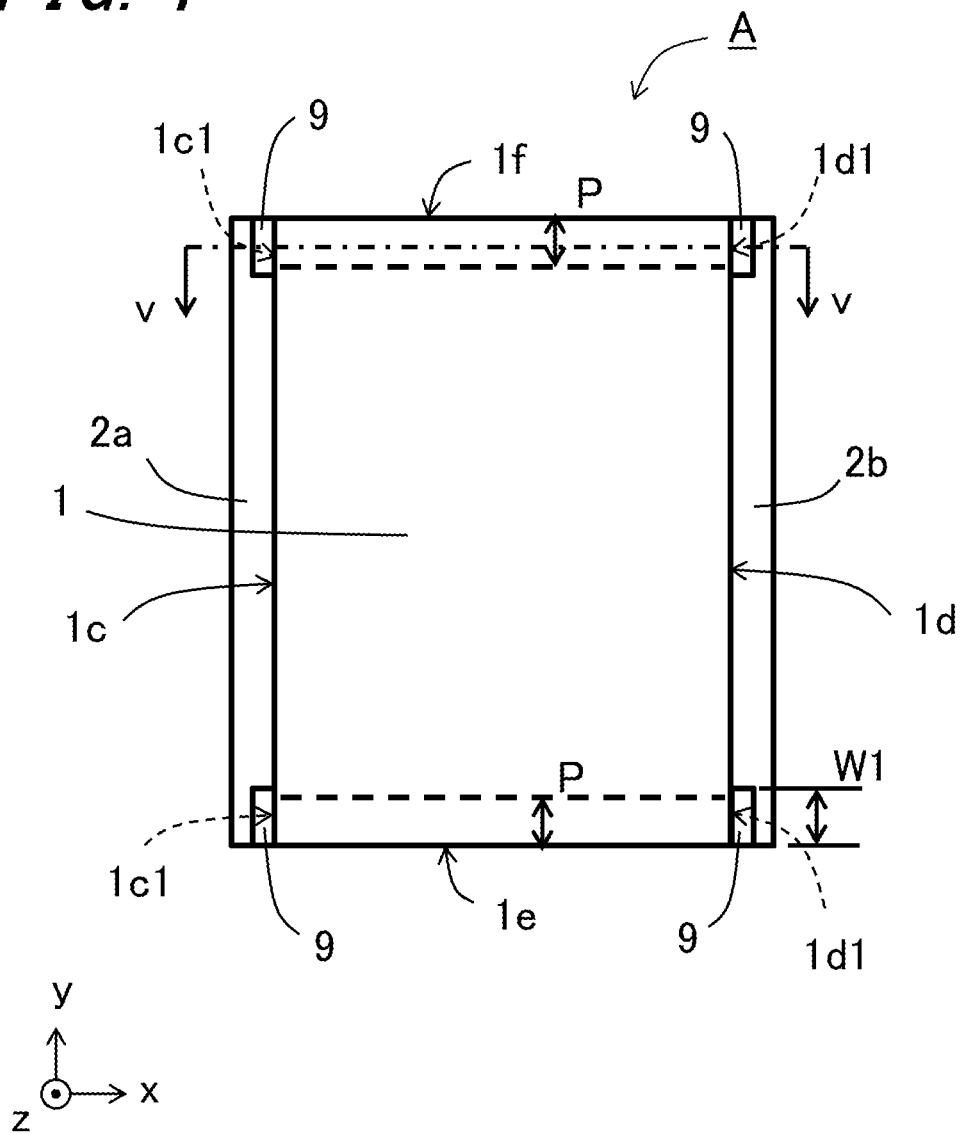
FIG. 4 is a plan view showing an example of the first embodiment of the invention.
Figure 5:
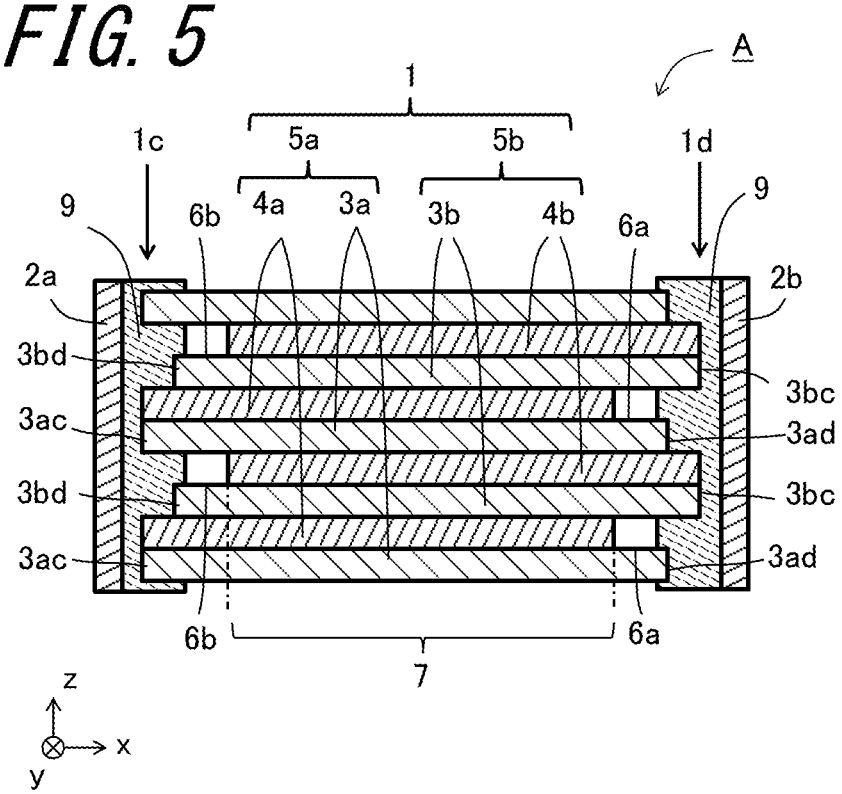
FIG. 5 is a sectional view of the film capacitor shown in FIG. 2A taken along the line v-v in FIG. 4.

As shown in FIGS. 1, 4, and 5, the film capacitor A includes insulating layers 9 disposed on the surface of the main body portion 1. A part of the first side face 1c extending from the corresponding second side face to a point spaced away from the second side face by a distance of less than or equal to P is defined as a first region 1c1, and a part of the first side face 1d extending from the corresponding second side face to a point spaced away from the second side face by a distance of less than or equal to P is defined as a first region 1d1. FIG. 5 is a sectional view of the film capacitor taken along the line v-v in FIG. 4, i.e., a sectional view of the film capacitor through the first regions 1c1 and 1d1. In the first embodiment, as shown in FIG. 4, the insulating layer 9 is disposed between the main body portion 1 and the external electrode 2 within each of the first region 1c1 and 1d1. That is, the insulating layer 9 exists between each of the first regions 1c1 and 1d1 and the external electrode 2. The insulating layer 9 is disposed on each of the first regions 1c1 and 1d1 as a continuous layer extending in the laminating direction z from the boundary with the first face 1a to the boundary with the first face 1b. The insulating layer 9 may partly cover each of the first faces 1a and 1b. The insulating layer 9 may also be contiguous to the boundary between each of the first side faces 1c and 1d and each of the second side faces 1e and 1f. Moreover, the insulating layer 9 may partly or wholly cover each of the second side faces 1e and 1f.

At each of the second side faces 1e and 1f, i.e., a cut surface, an end metal film 4ae, which is one of the metal films 4a connected to the external electrode 2a, may be brought into contact with an end metal film 4be which is one of the metal films 4b connected to the external electrode 2b. That is, contact between the end metal films 4e of different potentials may cause electrical short-circuiting.

With the first grooves 8 arranged at the interval P, adjacent first segments 4i are spaced apart from each other. The first regions 1c1 and 1d1 each include at least one first groove 8, and the first groove 8 keeps the end metal film 4e and the first segment 4i adjacent thereto separated. Moreover, within the first regions 1c1 and 1d1, the insulating layer 9 lies between the external electrode 2 and the main body portion 1, and this keeps the end metal film 4e and the external electrode 2 separated. This makes it possible to provide electrical isolation between the end metal film 4e and each of the external electrode 2 and other first segments 4i, and thereby reduce the influence of contact between the end metal film 4ae and the end metal film 4be on the insulation resistance of the film capacitor A.

Figure 6:
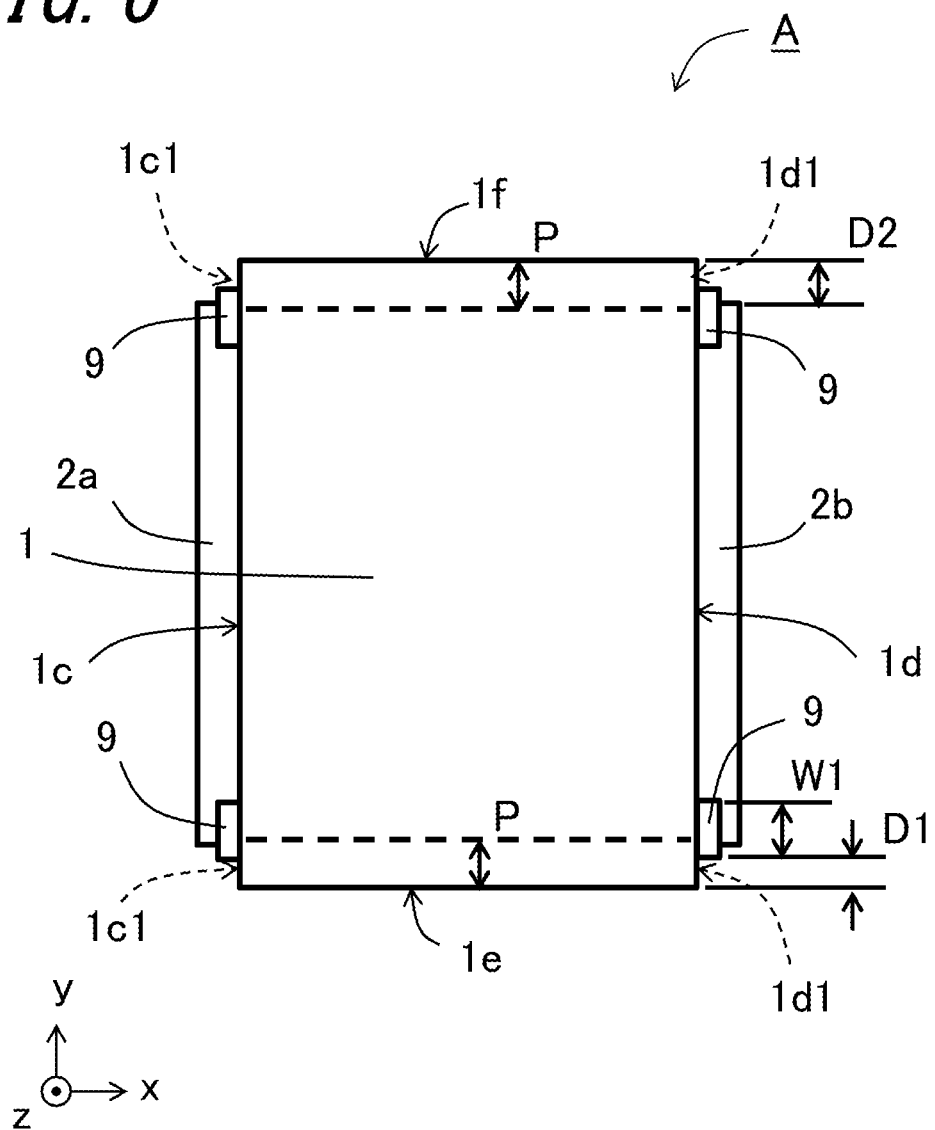
FIG. 6 is a plan view showing an example of the first embodiment.

In each of the first side faces 1c and 1d, D1 denotes a distance between the insulating layer 9 and each of the second side faces 1e and 1f, and D2 denotes a distance between each of the external electrodes 2 and each of the second side faces 1e and 1f. W1 represents the length of the insulating layer 9 in the second direction y. While D1 and D2 are each set at zero in FIGS. 1 and 4, the value of each of D1 and D2 may be greater than zero. Putting it another way, as shown in FIG. 6, both of the external electrode 2 and the insulating layer 9 may be spaced away from the boundary between each of the first side faces 1c and 1d and each of the second side faces 1e and 1f, or putting it still another way, each of the first regions 1c1 and 1d1 may include an area free of covering of both the insulating layer 9 and the external electrode 2.

D2 may be either equal to or greater than D1. The condition where D2 is greater than D1 encompasses a case where D1 is zero and D2 is greater than zero. The condition where D1 is zero encompasses a case where the insulating layer 9 is contiguous to the boundary between each of the first side faces 1c and 1d and each of the second side faces 1e and 1f, and also encompasses a case where the insulating layer 9 partly or wholly covers each of the second side faces 1e and 1f.

Fulfillment of the condition where D2 is greater than D1 ensures that the external electrode 2 is farther away from each of the second side face 1e and 1f than the insulating layer 9, and thus makes the external electrode 2 less likely to be brought into contact with the end metal film 4e contiguous to each of the second side faces 1e and 1f, i.e., a cut surface.

In the condition where D1 is zero, i.e., where the insulating layer 9 is contiguous to the boundary between each of the first side faces 1c and 1d and each of the second side faces 1e and 1f, as well as where the insulating layer 9 partly or wholly covers each of the second side faces 1e and 1f, then W1 represents the length of the insulating layer 9, disposed on each of the first side faces 1c and 1d, measured from the boundary with each of the second side faces 1e and 1f.

Second Embodiment

Figure 7:
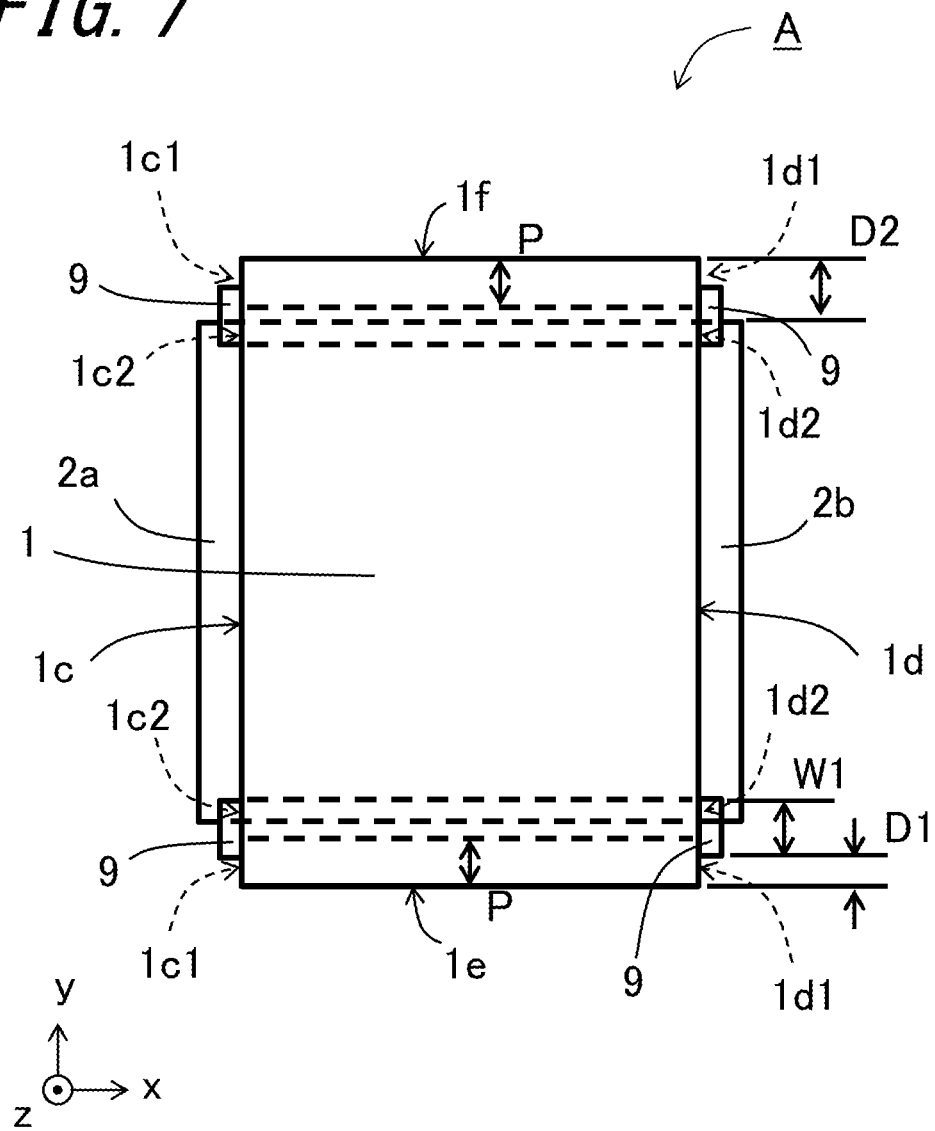
FIG. 7 is a plan view showing an example of the second embodiment of the invention.

As shown in FIG. 7, in the second embodiment of the invention, the external electrode 2 is not disposed in each of the first regions 1c1 and 1d1. In other words, the distance D2 between the external electrode 2 and each of the second side faces 1e and 1f is greater than P. The insulating layer 9 is disposed at an area of each of the first side faces 1c and 1d spaced away from each of the second side faces 1e and 1f by distances including the distance P. The insulating layer 9 extends in the laminating direction z on each of the first regions 1c1 and 1d1, and continues from the boundary with the first face 1a to the boundary with the first face 1b. The insulating layer 9 may partly cover each of the first faces 1a and 1b. The insulating layer 9 may be contiguous to the boundary between each of the first side faces 1c and 1d and each of the second side faces 1e and 1f. Moreover, the insulating layer 9 may partly or wholly cover each of the second side faces 1e and 1f. The distance D1 between the insulating layer 9 and each of the second side faces 1e and 1f falls in the range of zero or more and P or less. Hence, in the second embodiment, D2 is greater than D1. That is, in the second embodiment, the external electrode 2 is not disposed in each of the first regions 1c1 and 1d1, and is thus less likely to be brought into contact with the end metal film 4e.

In the second embodiment shown in FIG. 7, the insulating layer 9, while not overlapping with the external electrode 2 on each of the first regions 1c1 and 1d1, may overlap with the external electrode 2 at an area of each of the first side faces 1c and 1d spaced away from each of the second side faces 1e and 1f by a distance greater than P. An area of the first side face 1c spaced away from each of the second side faces 1e and 1f by a distance greater than P, where the insulating layer 9 and the external electrode 2 overlap with each other, is defined as a second region 1c2, and, an area of the first side face 1d spaced away from each of the second side faces 1e and 1f by a distance greater than P, where the insulating layer 9 and the external electrode 2 overlap with each other, is defined as a second region 1d2. Within each of the second regions 1c2 and 1d2, the insulating layer 9 may be disposed between the external electrode 2 and the main body portion 1. The insulating layer 9 disposed between the external electrode 2 and the main body portion 1 within the second region 1c2, 1d2, makes the external electrode 2 less likely to be brought into contact with the end metal film 4e. Within each of the second regions 1c2 and 1d2, the external electrode 2 may be located between the insulating layer 9 and the main body portion 1. Also in this arrangement, the external electrode 2 is not disposed in each of the first regions 1c1 and 1d1, in consequence whereof there results little influence of contact between individual end metal films 4e on the insulation resistance of the film capacitor A.

Figure 8:
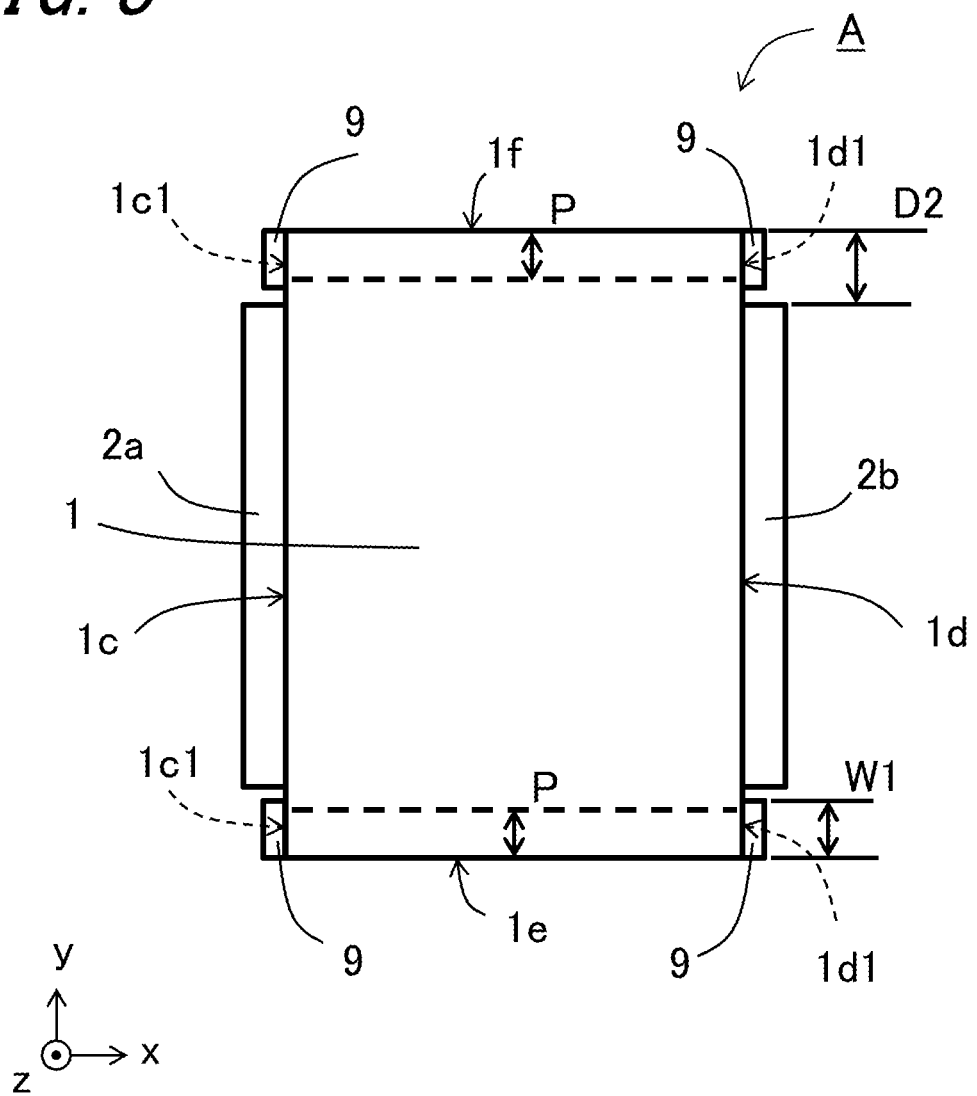
FIG. 8 is a plan view showing an example of the second embodiment.

As shown in FIG. 8, the insulating layer 9 and the external electrode 2 may be spaced apart on each of the second side faces 1e and 1f. Spacing the insulating layer 9 and the external electrode 2 apart makes the external electrode 2 less likely to be brought into contact with the end metal film 4e.

The following characteristics apply to both of the first and second embodiments described above.

The sum of the distance D1 between the insulating layer 9 and each of the second side faces 1e and 1f and the length W1 of the insulating layer 9 in the second direction y, which is given in mathematical expression form as: (D1+W1), may be greater than P. That is, the ratio of (D1+W1) to P, which is given in fractional expression form as: ((D1+W1)/P), may be greater than 1. Fulfillment of the condition where ((D1+W1)/P) is greater than 1 makes the external electrode 2 less likely to be brought into contact with the end metal film 4e.

The ratio of (D1+W1) to P, i.e., ((D1+W1)/P), may be less than or equal to 3. Fulfillment of the condition where ((D1+W1)/P) is less than or equal to 3 reduces the influence of the end metal film 4e on the insulation resistance of the film capacitor A without an excessive decrease in the capacitance of the film capacitor A. Note that ((D1+W1)/P) may be less than or equal to 2, or may be less than or equal to 1.5, in particular.

The insulating layer 9 may be larger in thickness than the dielectric film 3. Even when the insulating layer 9 and the dielectric film 3 are made of the same material, the insulating layer 9 of larger thickness than the dielectric film 3 exhibits greater insulation performance than the dielectric film 3. For example, the thickness of the insulating layer 9 may be larger than or equal to 3 µm. Moreover, the insulating layer 9 may be made with thickness of, for example, 800 µm or less to avoid that the thickness of the insulating layer 9 contributes to too large an increase in the volume of the film capacitor A.

Figure 9:
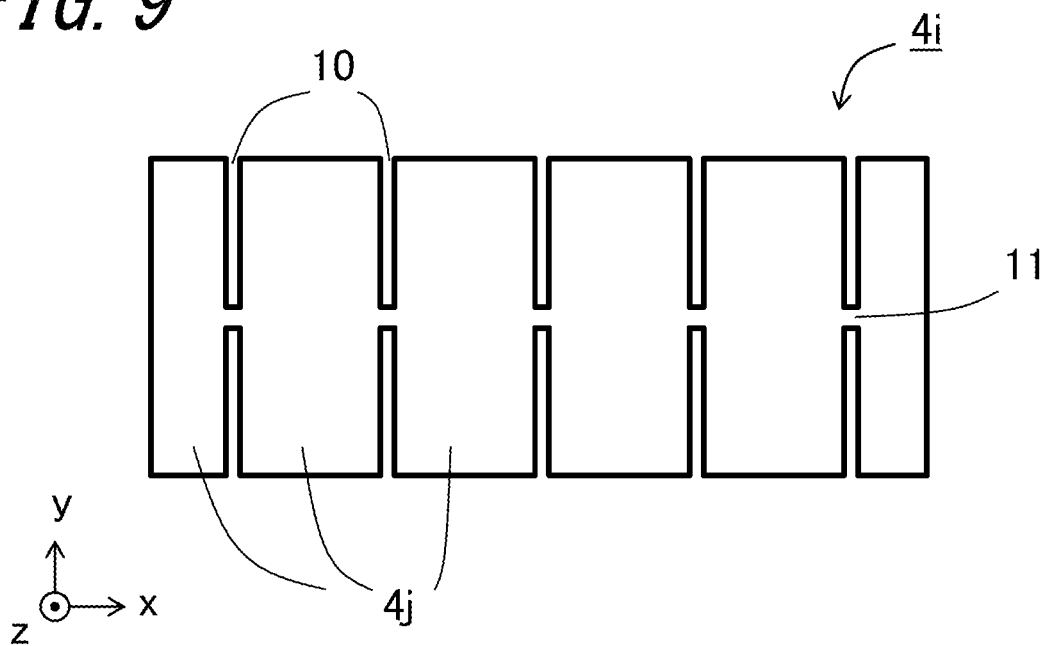
FIG. 9 is an enlarged plan view showing an example of an area indicated by dashed lines in FIG. 3A.
Figure 10:
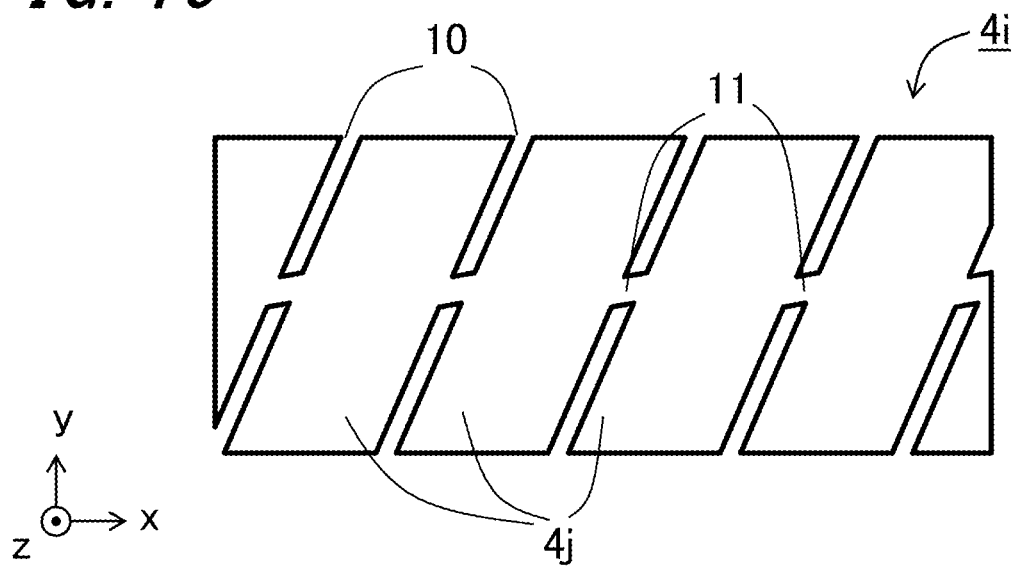
FIG. 10 is an enlarged plan view showing an example of the area indicated by dashed lines in FIG. 3A.
Figure 11:
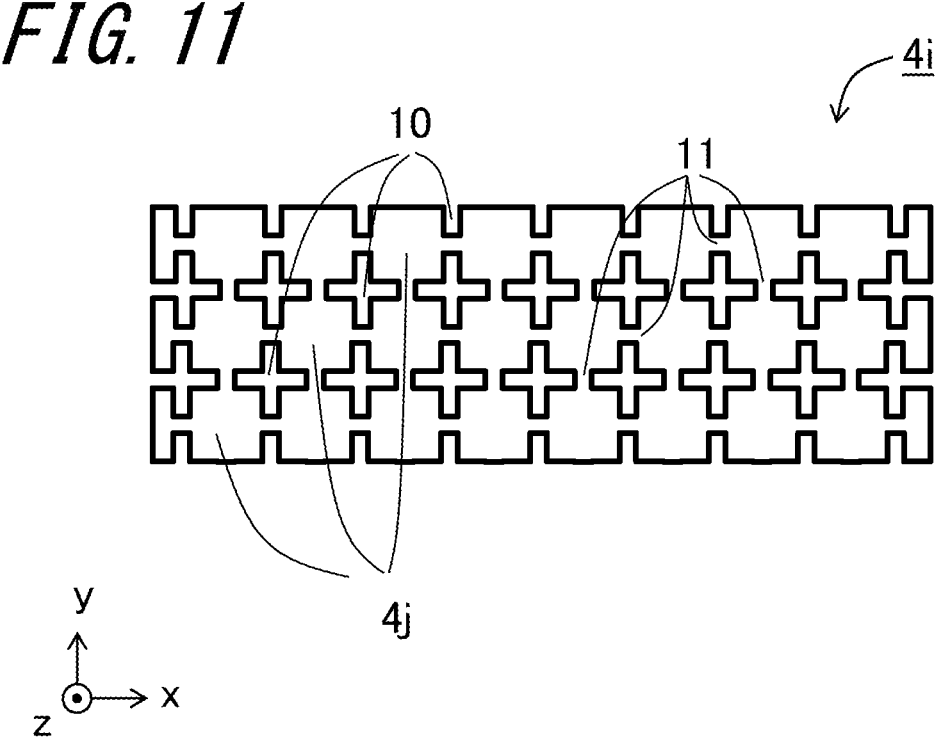
FIG. 11 is an enlarged plan view showing an example of the area indicated by dashed lines in FIG. 3A.

FIGS. 9 to 11 are enlarged plan views each showing an area of the first segment 4i indicated by dashed lines in FIG. 3A. The examples shown in FIGS. 9 to 11 are equally applicable to the first segment 4i shown in FIG. 3B. As shown in FIGS. 9 to 11, the first segment 4i of the metal film 4 may be divided by second grooves 10 into a plurality of subsegments as second segments 4j. Adjacent second segments 4j are electrically connected to each other via a fuse 11.

In FIG. 9, the second segments 4j are obtained by the placement of the second grooves 10 extending in the second direction y. The fuses 11 are located at the center in the second direction y of the second segments 4j for electrically connecting adjacent second segments 4j.

In FIG. 10, the second segments 4j are obtained by the placement of the second grooves 10 extending in a different direction than the first direction x and the second direction y. The fuses 11 electrically connect adjacent second segments 4j.

In FIG. 11, the second grooves 10, each in the shape of a crisscross defined by two lines extending in the first direction x and the second direction y, respectively, are arranged in a grid pattern. Adjacent second segments 4j are electrically connected to each other via the fuses 11 lying between the midportions of one side of one of the adjacent second segments 4j and one side of the other.

For example, the insulating layer 9 may be formed by, in the process of cutting a laminate including a plurality of metallized films 5a and 5b into the main body portions 1, sticking an insulating tape or the like or applying an insulating material to a location of cutting. After cutting the laminate provided with the insulating layer 9 into the main body portions 1, a so-called metallikon electrode is formed on each of the first side faces 1c and 1d of each main body portion 1. The film capacitor A is thus obtained. The insulating layer 9 may extend so as to lie also on each of the first faces 1a and 1b of the main body portion 1. Considering mutual separation of the metallized films 5 which may occur in the vicinity of each of the second side faces 1e and 1f of the main body portion 1, extending the insulating layer 9 disposed on each of the first side faces 1c and 2d so as to lie also on the first face 1a, 1b makes the metallized films 5 resistant to mutual separation.

For example, the film capacitor A as shown in FIGS. 6 to 8 in which at least a part on the insulating layer 9, or a part on the first side face 1c, 1d remains free of the external electrode 2 can be produced as follows. With a mask such as a tape placed on a part of the laminate where the external electrode 2 is not to be formed, the external electrode 2 may be formed, and then the mask such as a tape lying in contact with the external electrode 2 may be removed. Alternatively, in the laminate bearing an insulating tape or a coating of an insulating material for forming the insulating layer 9, a part of the laminate where the external electrode 2 is not to be formed may be masked by a metal mask, and then the external electrode 2 may be formed.

The insulating layer 9 may be made of any insulating material which is formable on the surface of the laminate including the metallized films 5. For example, the insulating layer 9 may be made of the same material as that used for the dielectric film 3, or a material which is greater in electrical insulation than the material used for the dielectric film 3. The insulating layer 9 may be made of an organic resin material. Specific examples of the organic resin material include polyimide, polyamide-imide, PTFE, polyarylate, polyethylene terephthalate, and polyphenylene sulfide. The insulating layer 9 may contain an adhesive in addition to such an organic resin material.

The aforestated characteristic points as to the insulating layer 9 are equally applicable to the following exemplifications.

In the main body portion 1 shown in FIG. 2B, metallized films 5a and metallized films 5b are alternately laminated, the metallized films 5a each including a metal film 4a1 and a metal film 4a2 provided on one side of the dielectric film 3a, the metallized films 5b each including a metal film 4b provided on one side of the dielectric film 3b. The metal film 4a1 is electrically connected to the external electrode 2a at the first side face 1c of the main body portion 1. The metal film 4a2 is electrically connected to the external electrode 2b at the first side face 1d of the main body portion 1. The metal film 4b is electrically connected to neither of the external electrode 2a and the external electrode 2b. The film capacitor A thus configured is referred to as a film capacitor of series connection type.

The metallized film 5a includes the metal film 4a1 and the metal film 4a2 provided on one side of the dielectric film 3a. The metallized film 5a includes, at its midportion in the first direction x, a metal film-free area, i.e., an area where the dielectric film 3a is left bare of the metal film, named as an insulation margin 6a in the form of a continuous portion extending in the second direction y.

The metallized film 5b includes the metal film 4b provided on one side of the dielectric film 3b. The metallized film 5b includes, in proximity to each end thereof in the first direction x, a metal film-free area, i.e., an area where the dielectric film 3b is left bare of the metal film, named as an insulation margin 6b in the form of a continuous portion extending in the second direction y. The dielectric film 3b is slightly smaller in width than the dielectric film 3a.

As shown in FIG. 2B, the metallized films 5a and 5b are laminated together so that the metallized film 5a includes each end projected somewhat beyond the corresponding end of the metallized film 5b in the first direction x. The dielectric film 3b is slightly smaller in width than the dielectric film 3a, and thus, in the main body portion 1, the first side faces 1c and 1d each include an offset area free of an overlap of the metallized film 5a and the metallized film 5b.

A potential difference between the metal film 4a1 and the metal film 4b causes capacitance in an effective region 7a where the metal film 4a1 and the metal film 4b overlap with each other, with the dielectric film 3a or 3b lying between them. A potential difference between the metal film 4a2 and the metal film 4b causes capacitance in an effective region 7b where the metal film 4a2 and the metal film 4b overlap with each other, with the dielectric film 3a or 3b lying between them. A first capacitance portion C1 including the effective region 7a and a second capacitance portion C2 including the effective region 7b are connected in series with each other.

Figure 12:
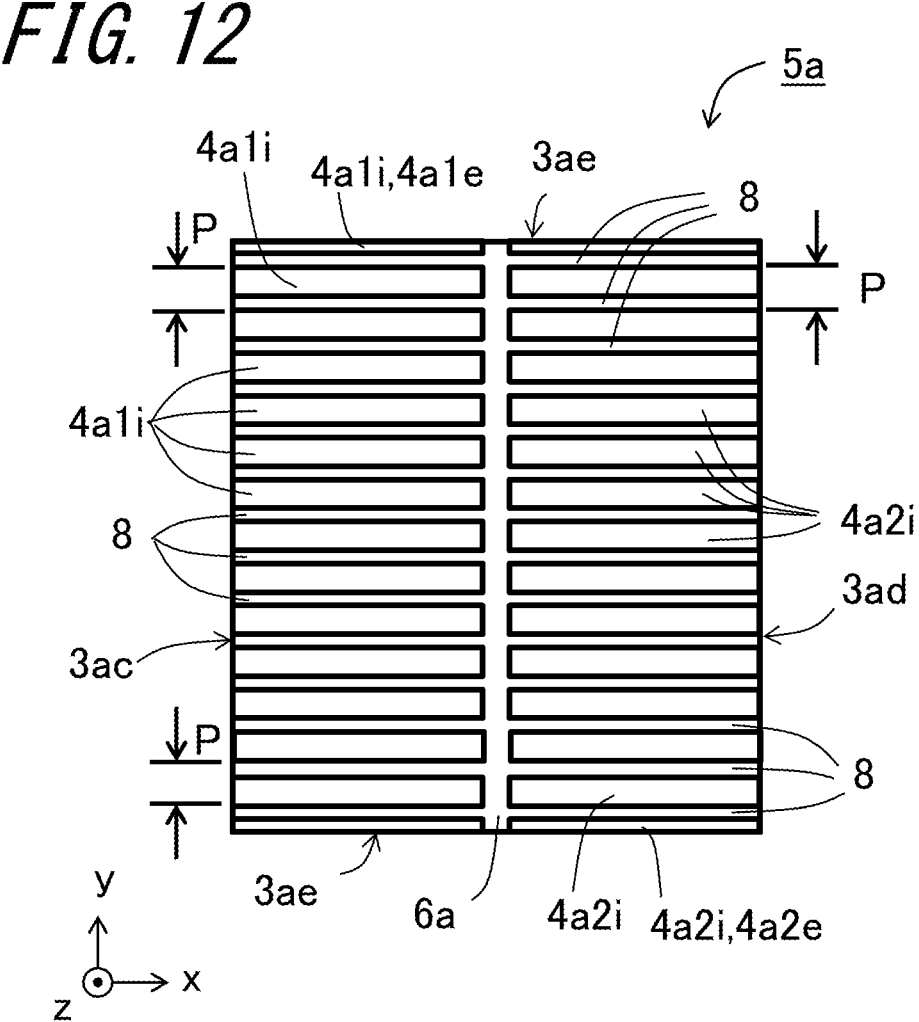
FIG. 12 is a plan view showing an example of one of the metallized films of the construction shown in FIG. 2B.

As shown in FIG. 12, the metal film 4a1 is divided into a plurality of first segments 4a1i by a plurality of first grooves 8 extending in the first direction x, and, the metal film 4a2 is divided into a plurality of first segments 4a2i by a plurality of first grooves 8 extending in the first direction x. The bottom of the first groove 8 is constituted by the dielectric film 3a. Each first groove 8 is a continuous groove extending from the corresponding one of a first end 3ac and a second end 3ad of the dielectric film 3a to the margin 6a.

Figure 13:
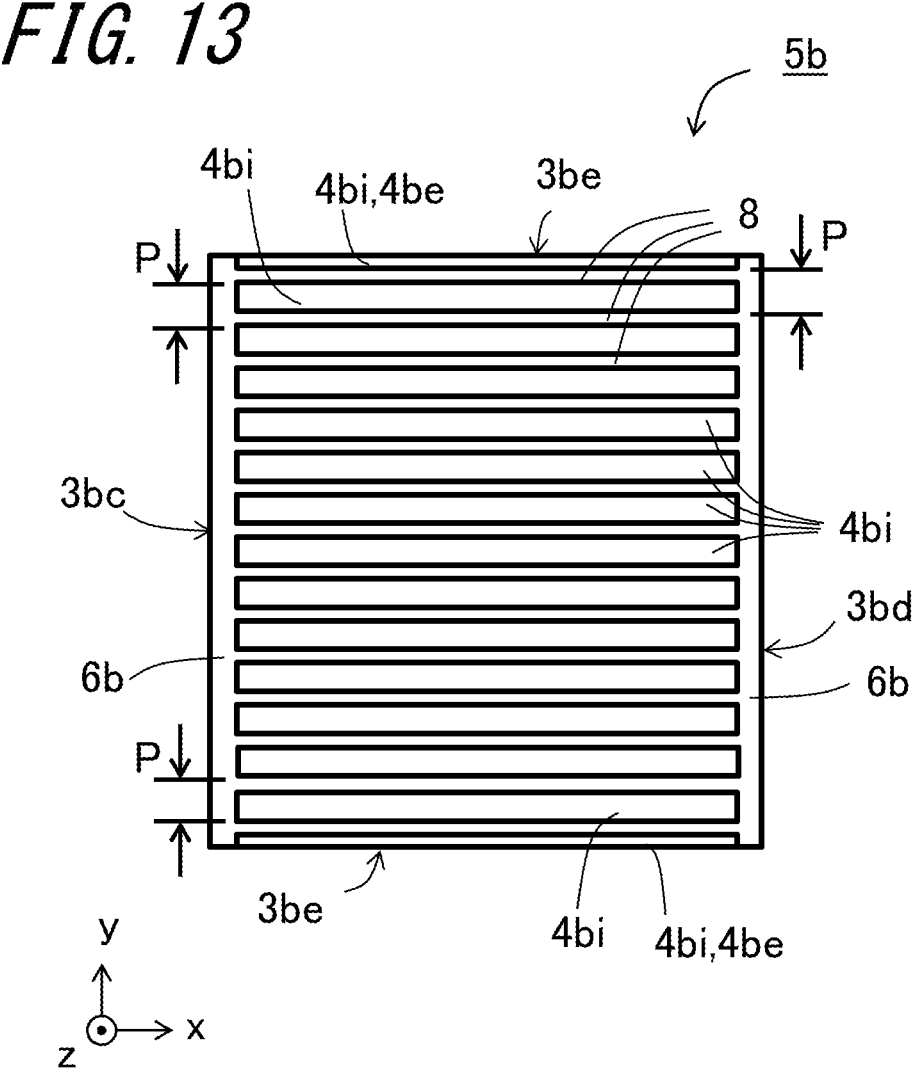
FIG. 13 is a plan view showing an example of the other one of the metallized films of the construction shown in FIG. 2B.

As shown in FIG. 13, the metal film 4b is divided into a plurality of first segments 4bi by a plurality of first grooves 8 extending in the first direction x. The bottom of the first groove 8 is constituted by the dielectric film 3b. Each first groove 8 is a continuous groove extending from the margin 6b at a first end 3bc of the dielectric film 3b to the margin 6b at a second end 3bd of the dielectric film 3b.

The characteristic points as to the first grooves 8 provided in the metal film 4, which have been described with reference to FIGS. 3A and 3B, are equally applicable to characteristic points as to the first grooves 8 provided in the metal films 4a1, 4a2, and 4b.

Figure 14:
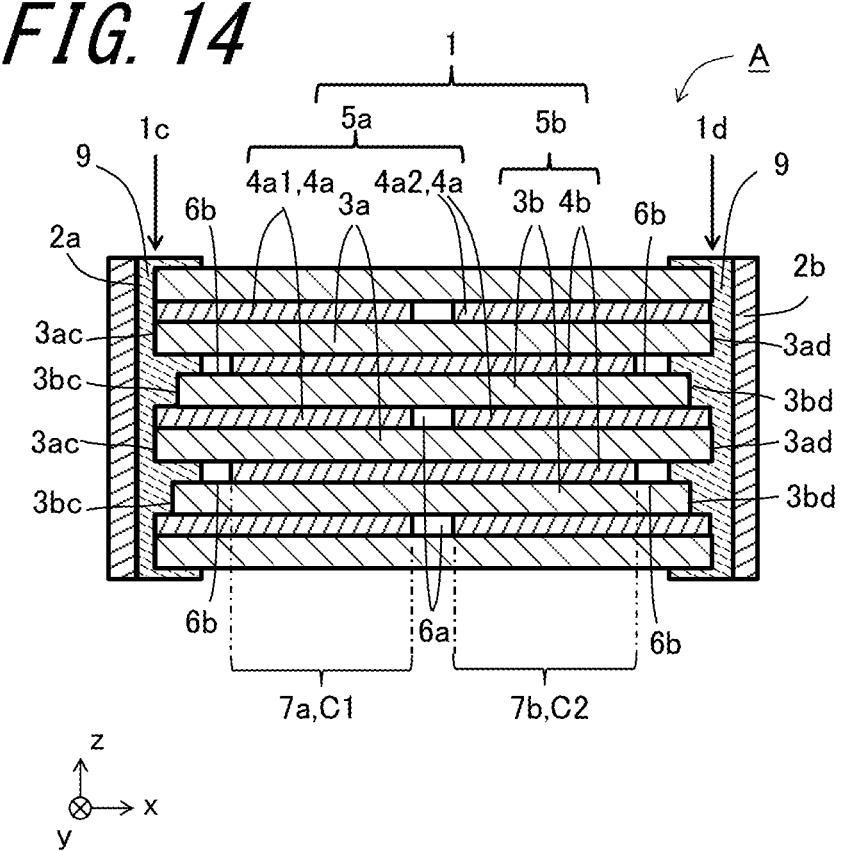
FIG. 14 is a sectional view of the film capacitor shown in FIG. 2B taken along the line v-v in FIG. 4.

Likewise, as shown in FIGS. 4, 6 to 8, and 14, the film capacitor A of series connection type includes insulating layers 9 disposed on the surface of the main body portion 1. FIG. 14 is a sectional view of the film capacitor A of series connection type taken along the line v-v in FIG. 4, i.e., a sectional view of the film capacitor A through the first regions 1c1 and 1d1 according to the first embodiment. In the film capacitor A of series connection type according to the second embodiment, as shown in FIGS. 7 and 8, the external electrode 2 is not disposed in each of the first regions 1c1 and 1d1. That is, the insulating layer 9 described with respect to the film capacitor A shown in FIG. 2A is equally applicable to the film capacitor A of series connection type shown in FIG. 2B.

Moreover, the first segment 4i including the second segments 4j shown in FIGS. 9 to 11 4i are equally applicable to the metallized films 5a and 5b shown in FIGS. 12 and 13.

The following description deals with characteristics that apply to both of the film capacitor A shown in FIG. 2A and the film capacitor A shown in FIG. 2B unless otherwise specified.

For example, the thickness of the dielectric film 3 may be less than or equal to 5 μm. Moreover, the dielectric film 3 having a thickness of 0.5 μm to 4 μm may be used.

The metal film 4 (4a, 4b) may have a heavy edge structure close to the junction with the external electrode 2 (2a, 2b). The heavy edge structure refers to a structure in which a part of the metal film 4 close to the junction with the external electrode 2 is lower in electrical resistance than the effective region 7 where the metal film 4a and the metal film 4b overlap with each other. The low-electrical-resistance part of the metal film 4 close to the junction with the external electrode 2 may be referred to as "heavy edge portion". In other words, the heavy edge structure refers to a structure in which the metal film 4 corresponding to the heavy edge portion is larger in thickness than the metal film 4 within the effective region 7. Note that the metal films 4 that are larger in thickness than the self-healing metal film 4 which can be volatilized for release by short-circuiting-induced energy, regardless of whether they are located in the effective region 7 or not, may be collectively called the heavy edge portion.

In the effective region 7, for example, the metal film 4 has a thickness of less than or equal to 20 nm, or may have a thickness of 5 nm to 15 nm, in particular. The metal film 4 made with thickness within this range has an area resistance (sheet resistance) of 18 to 50Ω/□, and thus can exhibit self-healing capability. The metal film 4a and the metal film 4b may be equal in thickness. One of the metal film 4a and the metal film 4b may be of uniform thickness of 20 nm or less throughout, and, in this case, the other is entirely made as a heavy edge portion. Moreover, the thickness of the part of the metal film 4 close to the junction with the external electrode 2, i.e., the heavy edge portion, may be two to four times the thickness of the metal film within the effective region 7, and more specifically, the thickness of that part may fall in the range of 10 nm or more and 80 nm or less.

Moreover, while the second segment 4j is rectangular-shaped as shown in FIGS. 9 to 11, any of a triangular shape, other polygonal shapes, a circular shape, an oval shape, and an indefinite shape may be adopted instead without special limitation.

Figure 15A:
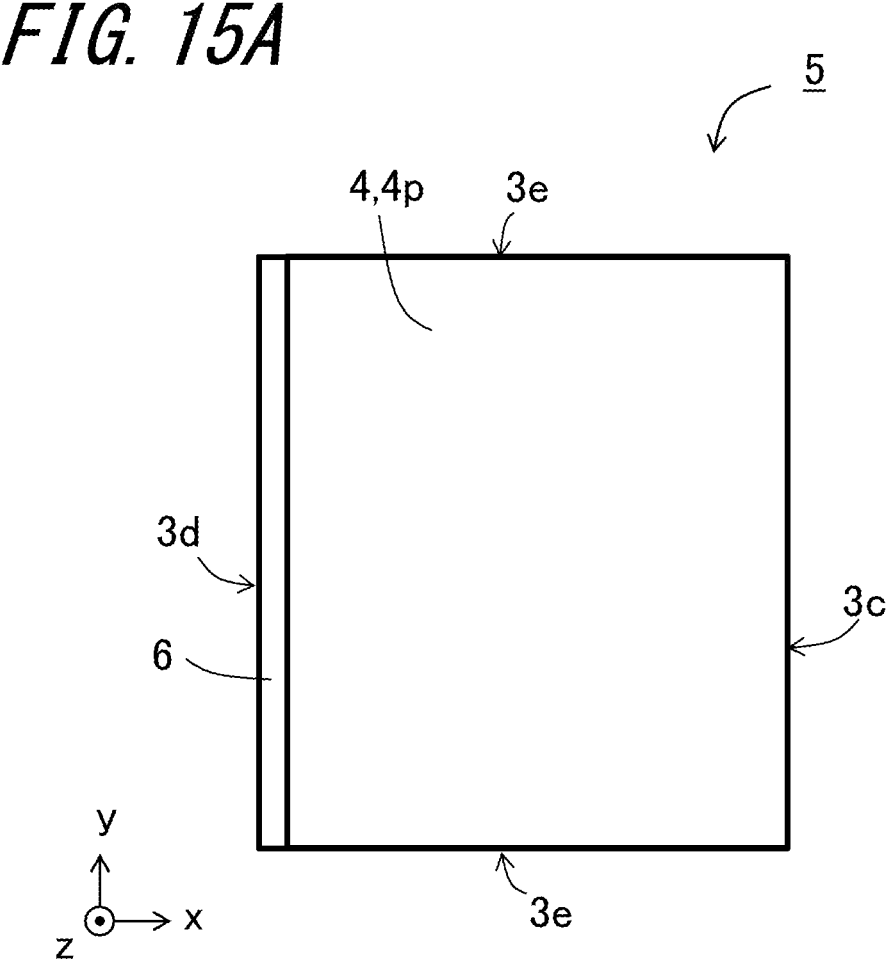
FIG. 15A is a plan view showing an example of the metallized film of the construction shown in FIG. 2A.

The film capacitor A may be configured so that both of the metal film 4a and the metal film 4b include the first segments 4i. The film capacitor A may alternatively be configured so that any one of the metal film 4a and the metal film 4b includes the first segments 4i. In another alternative, the film capacitor A may include the metal film 4a including the first segments 4i as shown in, for example, FIG. 3A or FIG. 3B, and the metal film 4b including no first segments 4i as shown in FIG. 15A. In other words, the film capacitor A may be configured so that the metal film 4a is divided into subsegments by the first grooves 8, whereas the metal film 4b is made as a single continuous metal film 4p.

Moreover, the film capacitor A of series connection type may be configured so that the metal film 4a1, the metal film 4a2, and the metal film 4b each include the first segments 4i. The film capacitor A of series connection type may alternatively be configured so that any one of the metal film 4a1, the metal film 4a2, and the metal film 4b includes the first segments 4i. In another alternative, the film capacitor A of series connection type may include the metal film 4a1 and the metal film 4a2 each including the first segments 4i as shown in, for example, FIG. 12, and the metal film 4b including no first segments 4i as shown in FIG. 15B. In still another alternative, the film capacitor A of series connection type may include the metal film 4a1 and the metal film 4a2 each including no first segments 4i as shown in FIG. 15C, and the metal film 4b including the first segments 4i as shown in FIG. 13. In other words, the film capacitor A of series connection type may be configured so that any one of the metal film 4b and the metal film 4a1, 4a2 is made as a single continuous metal film 4p.

Figure 16:
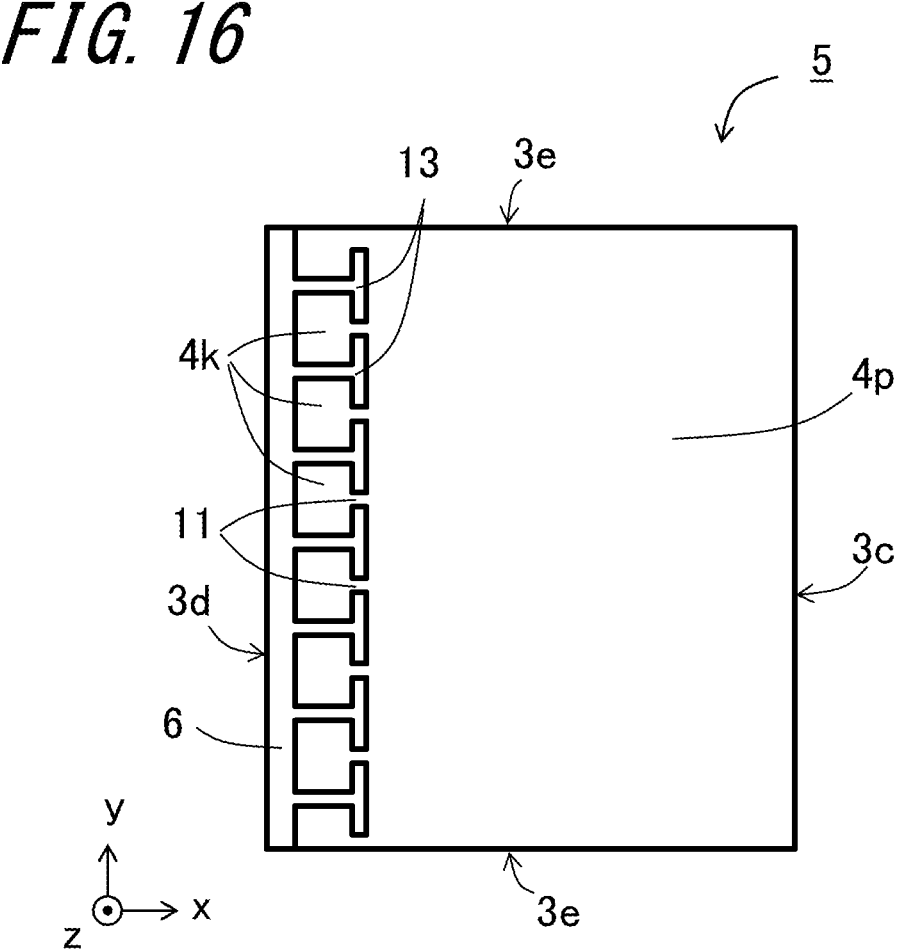
FIG. 16 is a plan view showing an example of the metallized film of the construction shown in FIG. 2A.

Given that the metal film 4a includes a heavy edge portion located in the effective region 7 and that, as shown in FIG. 15A, the metal film 4b does not include the first segments 4i obtained by division of the metal film by the first grooves 8, then the metal film 4b may include third segments 4k obtained by division of the metal film by third grooves 13. For example, as shown in FIG. 16, a part of the metal film 4b which is located next to the insulation margin 6 and overlaps with the heavy edge portion of the metal film 4a, is defined as a region R. The third segments 4k of the metal film 4b are each disposed at least in this region R so as to be electrically connected to the single continuous film 4p via the fuse 11. Although the heavy edge portion of the metal film 4a located in the effective region 7 is less prone to volatilization for release by short-circuiting-induced energy, with the third segments 4k provided in a part of the metal film 4b which overlaps with the heavy edge portion of the metal film 4a, the fuse 11 in a short-circuited area can be volatilized for release by short-circuiting-induced energy, causing electrical isolation of the third segments 4k overlapping with the heavy edge portion under electrical short-circuiting.

For example, the first groove 8, the second groove 10, and the third groove 13 each may have a width of 0.01 mm to 0.30 mm.

Examples of the insulating organic resin material used for the dielectric film 3 include polypropylene (PP), polyethylene terephthalate (PET), polyphenylene sulfide (PPS), polyethylene naphthalate (PEN), polyarylate (PAR), polyphenylene ether (PPE), polyetherimide (PEI), and cycloolefin polymer (COP). Cycloolefin polymer (COP) and polyarylate (PAR), in particular, are high in breakdown voltage level. Such an organic resin material may be used for the insulating layer 9.

For example, the dielectric film 3 is formed as follows: by applying a resin solution, which has been prepared by dissolving an insulating organic resin in a solvent, to the surface of a base film made of, for example, polyethylene terephthalate (PET), forming the resin coating into a sheet, and drying the formed sheet until the solvent evaporates. Any known film-forming technique selected from among a doctor blade method, a die coater method, a knife coater method, etc. may be used for the film formation. Examples of the solvent for use in the film formation include methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethyl acetamide, cyclohexane, and an organic solvent containing a mixture of two or more substances selected from among those given above. Alternatively, the dielectric film 3 may be obtained by subjecting an organic resin film produced by melt extrusion to drawing process.

While the dielectric film 3 may be composed solely of the insulating organic resin, other materials may be contained therein. Examples of other constituent elements than the organic resin that may be contained in the dielectric film 3 include such organic solvents as mentioned above and inorganic fillers. For example, inorganic oxide such as alumina, titanium oxide, or silicon dioxide, inorganic nitride such as silicon nitride, or glass may be used for the inorganic filler. The use of an inorganic filler made of a material having high relative permittivity, such as perovskite-structured composite oxide, in particular, can improve the relative permittivity of the dielectric film 3 as a whole, and thus reduce the volume of the film capacitor. Moreover, the inorganic filler may be subjected to surface treatment such as silane coupling treatment or titanate coupling treatment to enhance compatibility between the inorganic filler and the organic resin.

The dielectric film 3, when containing such an inorganic filler, may be made as a composite film having an inorganic filler content of less than 50% by mass and an organic resin content of greater than or equal to 50% by mass. The dielectric film 3 having such an inorganic filler-to-organic resin ratio can exhibit higher relative permittivity on the strength of the inorganic filler, while maintaining the flexibility of the organic resin. The inorganic filler may fall in the range of 0.5 nm or more and 1000 nm or less in size (average particle size).

The metallized film 5 is obtained by forming, on one side of the dielectric film 3 with a mask placed thereon, the metal film 4 from a metal component such as aluminum (Al) by vapor deposition. An area masked in this process becomes the margin 6. For the case of the construction shown in FIG. 2A, a mask is placed on one of the opposite ends of the dielectric film 3 in the first direction x. For the case of the construction shown in FIG. 2B, a mask is placed on each of the opposite ends of the dielectric film 3 in the first direction x, or on a midportion of the dielectric film 3 in the first direction x.

In forming the heavy edge structure, with a mask placed on the metallized film 5 except for the area where the heavy edge portion is to be formed, for example, zinc (Zn) is vapor-deposited onto the mask-free area of the vapor-deposited metal component. The vapor deposition is carried out so that the thickness of the vapor-deposited film for forming the heavy edge portion is one to three times the thickness of the vapor-deposited metal component.

The metal film 4 is patterned as required. Examples of the way of defining a pattern in the metal film 4 include an oil-assisted transfer patterning method and a laser patterning method. According to the oil-assisted transfer patterning method, a metal component is vapor-deposited onto the dielectric film 3 with an oil mask placed thereon. According to the laser patterning method, after vapor deposition of a metal component onto the dielectric film 3, a part of the metal film 4 is volatilized by a laser using a laser marking machine or a laser trimming machine. Any one of a green laser, a YAG laser, and a $CO_2$ laser may be used as the laser.

<Method of Manufacturing Film Capacitor>

The laminated type film capacitor A according to the disclosure may be manufactured as follows. To obtain the laminate first, the metallized film 5 (5a, 5b) including the metal film 4 (4a, 4b) provided on one side of the dielectric film is cut to a predetermined shape, and a plurality of the metallized films are laminated together. At this time, for the case of the construction shown in FIG. 2A, the metallized films 5a and 5b are alternately laminated together so that the margins 6a and 6b are located at different ends of the laminate in the first direction x. Moreover, as shown in FIG. 2A, the metallized film 5a and the metallized film 5b are disposed so as to be slightly displaced in relation to each other in the first direction x. On the other hand, for the case of the construction shown in FIG. 2B, the metallized films 5a, each including the centrally located margin 6a in the first direction x, and the metallized films 5b, each being slightly smaller in width than the metallized film 5a in the first direction x and including the margins 6b lying one on each end thereof in the first direction x, are alternately laminated together.

The laminate thus obtained is cut into separate individual main body portions 1. At this time, the insulating layer 9 may be formed by sticking an insulating tape or applying an insulating material to a location of cutting. The laminate provided with the insulating layer 9 is cut into the main body portions 1, and, the external electrode 2 is formed on each of the first side faces 1c and 1d of the obtained main body portion 1. The film capacitor A is thus obtained. After the insulating layer 9 is formed on the laminate, the external electrode 2 may be formed on a face of the laminate which becomes each of the first side faces 1c and 1d prior to the laminate cutting process. The external electrode 2 may be formed by means of metallic spraying, sputtering, plating, or otherwise.

Subsequently, the surface of the main body portion 1 provided with the external electrode 2 may be covered with an exterior member, not shown, as required.

As the material of construction of the external electrode 2, at least one metal material selected from among zinc, tin, aluminum, copper, and solder can be used.

<Combination Type Capacitor>

Figure 17:
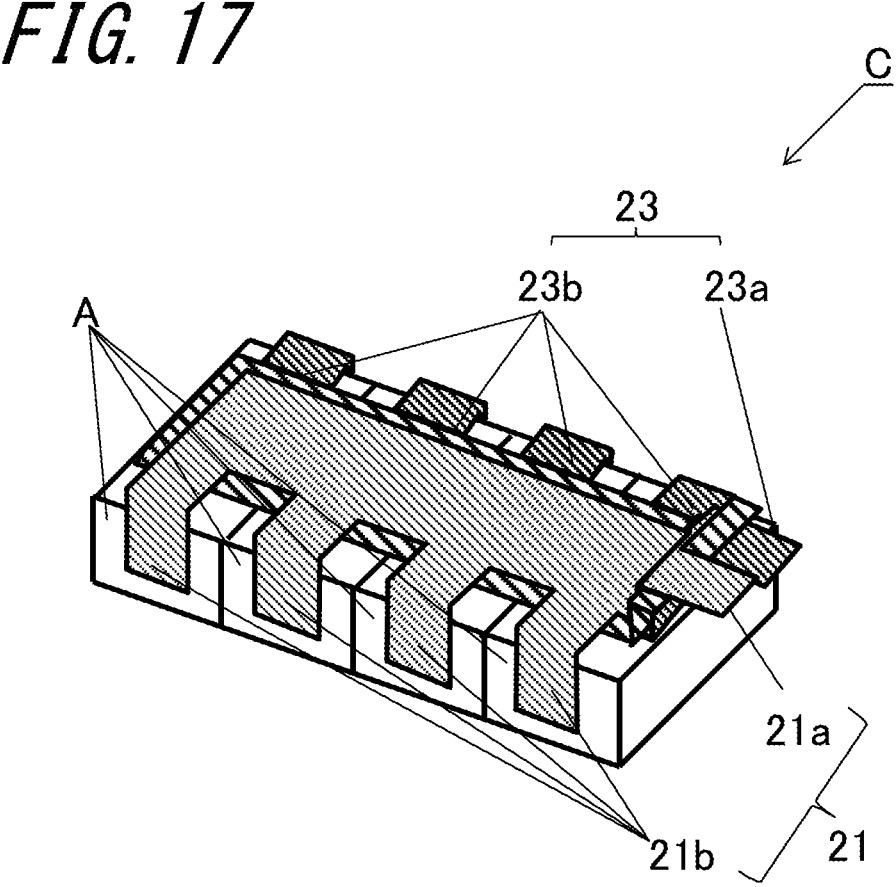
FIG. 17 is a perspective view schematically showing a combination type capacitor.

FIG. 17 is a perspective view schematically showing one embodiment of a combination type capacitor. For ease in understanding the structure of the combination type capacitor, the illustration of a case and an exterior resin for covering the surface of the capacitor is omitted from FIG. 17. The combination type capacitor C includes a plurality of film capacitors connected in parallel with each other via a pair of bus bars 21 and 23. The bus bar 21 includes a terminal portion 21a for external connection and an extraction terminal portion 21b, and, the bus bar 23 includes a terminal portion 23a for external connection and an extraction terminal portion 23b. The extraction terminal portions 21b are 23b are connected to the external electrodes 2a and 2b, respectively, of the film capacitor.

When the combination type capacitor C includes the above-described film capacitor A including the insulating layer 9, it is possible to obtain a combination type capacitor C having high dielectric withstanding voltage.

The combination type capacitor C may include at least one film capacitor A, or may include two or more film capacitors A. The combination type capacitor C is obtained by attaching the bus bars 21 and 23 to the external electrodes 2a and 2b, which are formed at each end of the main body portion 1, respectively, via joining materials in a state where a plurality of, for example, four as shown in FIG. 17, film capacitors are juxtaposed.

The combination type capacitor C may be constructed of a side-by-side arrangement of film capacitors as shown in FIG. 17, or a stack of film capacitors. Moreover, the film capacitors 4 may be aligned so that the arrangement direction of the external electrodes 2, i.e., the first direction x conforms to a vertical direction.

The film capacitor A and the combination type capacitor C may be formed into a resin-molded (case-molded) capacitor by housing the film capacitor A or the combination type capacitor C in a case and then filling a space in the case with the resin.

<Inverter>

Figure 18:
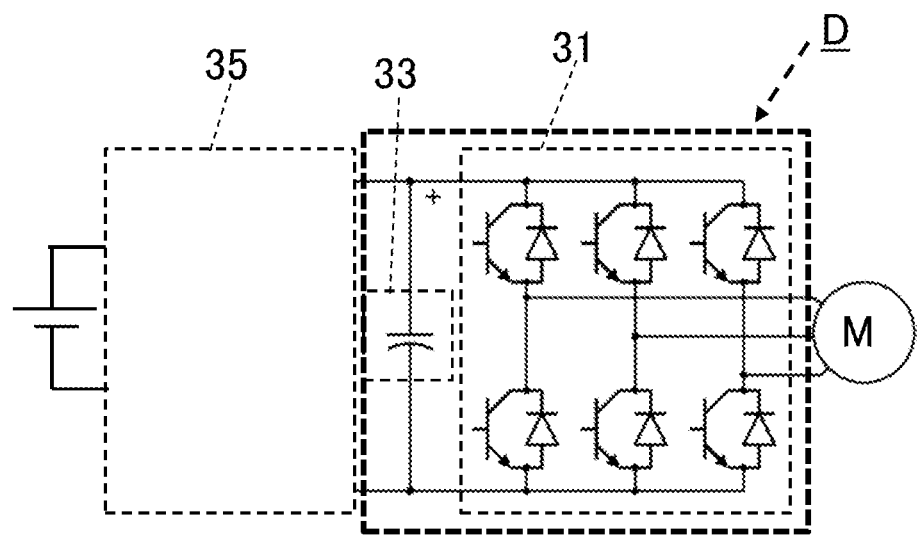
FIG. 18 is a schematic view showing an embodiment of an inverter.

FIG. 18 is a schematic block diagram for explaining one embodiment of an inverter. FIG. 18 shows an inverter D for producing alternating current from direct current by way of example of the embodiment. As shown in FIG. 18, the inverter D includes a bridge circuit 31 and a capacitance member 33. For example, the bridge circuit 31 includes switching elements such as IGBTs (Insulated gate Bipolar Transistors) and diodes. The capacitance member 33 is interposed between input terminals of the bridge circuit 31 for voltage stabilization. The inverter D includes the above-described film capacitor A or combination type capacitor C as the capacitance member 33.

The inverter D is connected to a booster circuit 35 for boosting DC power voltage. The bridge circuit 31 is connected to a motor generator (motor M) which serves as a drive source.

<Electric Vehicle>

Figure 19:
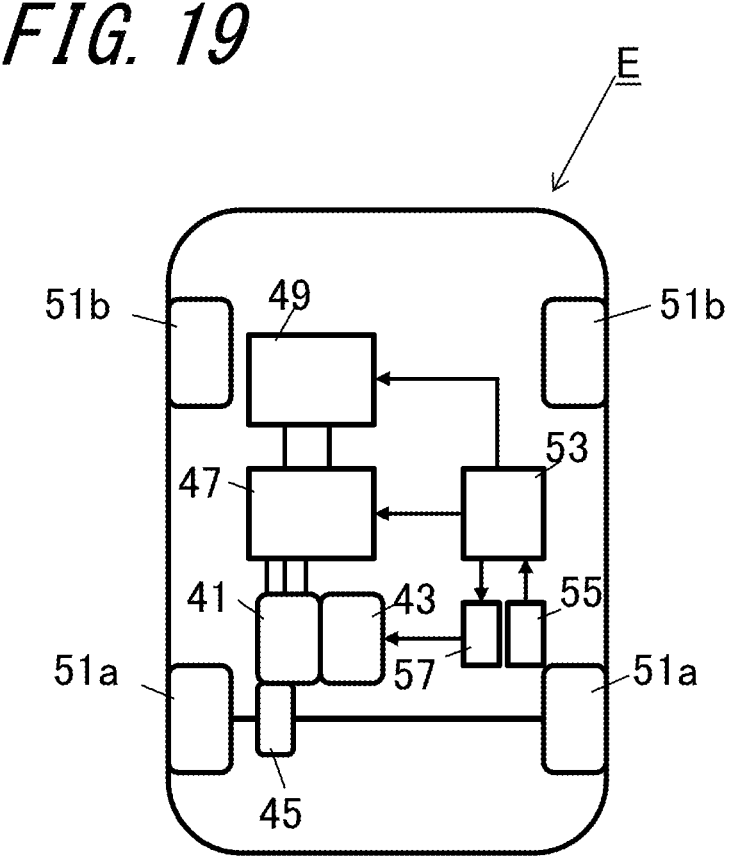
FIG. 19 is a schematic view showing an embodiment of an electric vehicle.

FIG. 19 is a schematic block diagram showing an electric vehicle. FIG. 19 shows a hybrid electric vehicle (HEV) by way of example of the embodiment.

The electric vehicle E includes a drive motor 41, an engine 43, a transmission 45, an inverter 47, a power supply (battery) 49, front wheels 51a, and rear wheels 51b.

The electric vehicle E includes the motor 41 or the engine 43 or both of them serving as a drive source. An output of the drive source is transmitted to a pair of right and left front wheels 51a via the transmission 45. The power supply 49 is connected to the inverter 47, and the inverter 47 is connected to the motor 41.

Moreover, the electric vehicle E shown in FIG. 19 includes a vehicle ECU 53 and an engine ECU 57. The vehicle ECU 53 performs comprehensive control of the entire electric vehicle E. The engine ECU 57 controls a rotation speed of the engine 43 to drive the electric vehicle E. The electric vehicle E further includes driving devices such as an ignition key 55, a non-illustrated accelerator pedal, or a non-illustrated brake, which are operated by a driver or others. Drive signals responsive to the operation of the driving devices by a driver or others are inputted to the vehicle ECU 53. The vehicle ECU 53 outputs instruction signals to the engine ECU 57, the power supply 49, and the inverter 47 as a load based on the drive signals. The engine ECU 57 controls a rotation speed of the engine 43 in response to the instruction signals to drive the electric vehicle E.

An inverter D, i.e., the inverter D including the above-described film capacitor A or combination type capacitor C as the capacitance member 33, is used as the inverter 47 of the electric vehicle E. Since, in such an electric vehicle E, the dielectric withstanding voltage of the film capacitor A is high, a decrease in insulation resistance of the film capacitor A or the combination type capacitor C can be kept small over a long period of time. As a result, in the electric vehicle E, current control of control devices such as ECUs can be made more stable.

The inverter D of the embodiment can be applied not only to the hybrid electric vehicle (HEV) as described above, but also to various power conversion application products such as an electric vehicle (EV), a fuel cell vehicle, an electric bicycle, a power generator or a solar cell.

EXAMPLES

A dielectric film, which was 3 µm in average thickness, was formed from polyarylate (U-100) manufactured by UNITIKA Ltd. The dielectric film was obtained by dissolving polyarylate in toluene, applying the solution onto a polyethylene terephthalate (PET)-made base film with a coater, forming the coating into a sheet, and heat-treating the formed sheet at 130° C. to remove toluene.

The dielectric film thus obtained was separated from the base film. After slitting the dielectric film into a 200 mm-wide film, a metal film was formed on one surface of the dielectric film by vacuum vapor deposition as follows.

With an oil mask placed on a face of the dielectric film opposite to the face thereof which was previously in contact with the base film, a 52 mm-wide Al (aluminum) metal film was formed on a central area of the face in a width direction, i.e., the first direction x. An average thickness of the Al metal film was 20 nm. After that, as a heavy edge portion, a 8.8 mm-wide Zn (zinc) metal film was formed at a central area of the width direction on the obtained Al metal film using a metal mask. An average thickness of the Zn metal film was 40 nm.

The dielectric film formed with the metal film was slit at its widthwise midportion and ends so as to obtain a 28 mm-wide metallized film. A width of the insulation margin of the obtained metallized film was 1 mm, and a width of the heavy edge portion thereof was 4.4 mm.

The first grooves as shown in FIG. 3A were formed in the Al metal film using an oil mask. The interval between the first grooves was constant at 2 mm. That is, P stands at 2 mm. A width of the first groove was 0.2 mm.

A pair of metallized films was laminated on top of each other so that each heavy edge portion was located on the opposite side of the construction in the first direction x, and that a heavy edge portion of one metallized film protruded by 0.5 mm in the first direction x from an edge of the other metallized film. A wound body including a plurality of annularly connected film capacitors was made from 450 turns of the laminated metallized film pair, wound about a 200 mm-diameter drum. Note that the pair of metallized films was laminated together, with a single dielectric film lying between them.

An organic resin film which served as the insulating layer was wound on the obtained annular wound body in the first direction x so that a plurality of organic resin film-bearing portions were arranged at uniform interval of 50 mm in the second direction y. In Sample Nos. 1 through 13, a polyimide adhesive tape was used as the organic resin film. An average thickness of the polyimide adhesive tape for use in Sample Nos. 1 through 5 and Sample Nos. 8 through 13 was 35 µm, whereas an average thickness of the polyimide adhesive tape for use in Sample Nos. 6 and 7 was 80 µm. Sample Nos. 1 through 6 and Sample Nos. 8 through 13 each had the organic resin film of one turn, whereas Sample No. 7 had the organic resin film of 10 turns.

In Sample Nos. 14 and 15, a polyarylate film was used as the organic resin film. An average thickness of the polyarylate film for use in Sample No. 14 was 2 µm, whereas an average thickness of the polyarylate film for use in Sample 15 was 3 µm. Each sample had the organic resin film of one turn.

The polyarylate film for use as the organic resin film in Sample Nos. 14 and 15, which was produced by the earlier described sheet forming process, was wound on the wound body and then fixed at the first faces of the wound body arranged in the laminating direction z using a polyimide adhesive tape whose average thickness was 35 µm.

The organic resin film which served as the insulating layer had a width of 2 mm to 16 mm. More specifically, the widths of the organic resin films were 3 mm in the case of Sample No. 1, 4 mm in the case of Sample No. 2, 8 mm in the case of Sample Nos. 3, 6, 7, 14 and 15, 12 mm in the case of Sample No. 4, and 16 mm in the case of Sample No. 5.

In Sample Nos. 8 through 13, a side-by-side arrangement or stack of a plurality of organic resin films was wound on the wound body. Sample No. 8 has a turn of a 4 mm-wide organic resin film with a centrally located 2 mm-wide organic resin film thereover. Sample No. 9 has a turn of a stack of two 4 mm-wide organic resin films. Sample No. 10 has a turn of a 4 mm-wide organic resin film with a 8 mm-wide organic resin film thereover. Sample No. 11 has a turn of a set of three 2 mm-wide organic resin films juxtaposed in the width direction. Sample No. 12 has a turn of a set of three 2 mm-wide organic resin films juxtaposed in the width direction, and has an additional turn of a 4 mm-wide organic resin film lying on a central area in the width direction of the former turn. Sample No. 13 has a turn of a set of three 2 mm-wide organic resin films juxtaposed in the width direction, and has an additional turn of a 8 mm-wide organic resin film lying on a central area in the width direction of the former turn.

The wound body wound thereon the organic resin films was cut at a central area in the width direction of each organic resin film turn so as to obtain laminates which served as main body portions, each measuring 50 mm in width in the second direction y. In this case, the number of the first grooves included in each layer of the laminate was 25. In the obtained insulating layer-bearing laminate, each of its side faces arranged in opposed relation in the first direction x, i.e., each first side face was subjected to Zn (zinc)-arc spraying to form a metallikon electrode thereon as the external electrode. The film capacitor was thus obtained. Following the formation of the metallikon electrode, adjustments were made to cause variations in D1 and D by removing the upper organic resin film in each of Sample Nos. 8 through 10, removing the organic resin film at a location of cutting in Sample No. 11, and removing both the upper organic resin film and the organic resin film at a location of cutting in each of Sample Nos. 12 and 13. Sample Nos. 10 and 13 were each similar in configuration to the construction shown in FIG. 8. Sample No. 11 corresponds to the construction shown in FIG. 6 on condition that D1 equals to D2. Sample No. 12 is similar in configuration to the construction shown in FIG. 7.

Each film capacitor thereby produced was evaluated for capacitance and dielectric withstanding voltage. Capacitance measurement was carried out under the following conditions: AC 1V, 1 kHz using LCR meter. Dielectric withstanding voltage measurement was carried out through a test to apply DC voltages ranging from 0 V to 900 V at the maximum to each film capacitor using insulation resistance tester. DC voltages ranging from 0 V to 900 V was applied to each film capacitor at a voltage raising rate of 10 V per second. A voltage at which the value of leakage current reached 0.01 A in each film capacitor was determinative of the dielectric withstanding voltage of the film capacitor.

TABLE 1

| Sample No. | First groove P mm | Insulating layer D1 mm | W1 mm | (D1 + W1)/P — | Average thickness μm | External electrode D2 mm | Evaluation Capacitance μF | Dielectric withstanding voltage V |
|---|---|---|---|---|---|---|---|---|
| 1 | 2.0 | 0 | 1.5 | 0.8 | 35 | 0 | 8.0 | 250 |
| 2 | 2.0 | 0 | 2.0 | 1.0 | 35 | 0 | 7.8 | >900 |
| 3 | 2.0 | 0 | 4.0 | 2.0 | 35 | 0 | 7.1 | >900 |
| 4 | 2.0 | 0 | 6.0 | 3.0 | 35 | 0 | 6.5 | >900 |
| 5 | 2.0 | 0 | 8.0 | 4.0 | 35 | 0 | 5.8 | >900 |
| 6 | 2.0 | 0 | 4.0 | 2.0 | 80 | 0 | 7.0 | >900 |
| 7 | 2.0 | 0 | 4.0 | 2.0 | 800 | 0 | 6.8 | >900 |
| 8 | 2.0 | 0 | 2.0 | 1.0 | 35 | 1.0 | 7.7 | >900 |
| 9 | 2.0 | 0 | 2.0 | 1.0 | 35 | 2.0 | 7.8 | >900 |
| 10 | 2.0 | 0 | 2.0 | 1.0 | 35 | 4.0 | 7.0 | >900 |
| 11 | 2.0 | 1.0 | 2.0 | 1.5 | 35 | 1.0 | 7.5 | >900 |
| 12 | 2.0 | 1.0 | 2.0 | 1.5 | 35 | 2.0 | 7.6 | >900 |
| 13 | 2.0 | 1.0 | 2.0 | 1.5 | 35 | 4.0 | 7.0 | >900 |
| 14 | 2.0 | 0 | 4.0 | 2.0 | 2 | 0 | 7.1 | 400 |
| 15 | 2.0 | 0 | 4.0 | 2.0 | 3 | 0 | 7.1 | >900 |

In Sample Nos. 2 through 15, the insulating layer was located between the main body portion and the external electrode within the first region, or the external electrode was not located in the first region, and even when a DC voltage of 400 V was applied, the leak current was 0.01 A or less. Sample Nos. 2 through 13 and Sample No. 15, in particular, had high insulating properties with a leak current of less than 0.01 A even when a DC voltage of 900 V was applied.

In Sample No. 14, since the insulating layer is smaller in average thickness than the dielectric film, leak current reached 0.01 A when a DC voltage of 400 V was applied, and its insulating property is relatively low. This is probably because a part of the organic resin film was broken when forming the metallikon electrode. As a result, it is considered that, a part of the end metal film is likely to be electrically connected to the external electrode, and the end metal film is short-circuited on the second side face that is a cut surface.

Moreover, Sample Nos. 2 through 4, Sample Nos. 6 through 13, and Sample No. 15 had ((D1+W1)/P) of 3 or less, and had relatively large capacitance.

In Sample No. 1, the insulating layer was not located between the main body portion and the external electrode within the first region, an area where the external electrode and the first region made direct contact with each other was present, the leak current reached 0.01 A when a DC voltage of 250 V was applied, and its insulating property was relatively low. This is probably because the end metal film electrically connected to the external electrode was short-circuited on the second side face that is a cut surface.

REFERENCE SIGNS LIST

A: Film capacitor
C: Combination type capacitor
D: Inverter
E: Electric vehicle
1: Main body portion
  1a, 1b: First face
  1c, 1d: First side face
    1c1, 1d1: First region
  1e, 1f: Second side face
2, 2a, 2b: External electrode
3, 3a, 3b: Dielectric film
4, 4a, 4a1, 4a2, 4b: Metal film
  4i, 4a1i, 4a2i, 4bi: First segment
  4e: End metal film
  4j: Second segment
5, 5a, 5b: Metallized film
6: Insulation margin
7: Effective region
8: First groove
9: Insulating layer
10: Second groove
11: Fuse
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A film capacitor, comprising:
a main body portion shaped in a rectangular prism, comprising dielectric films and metal films which are laminated;
a pair of external electrodes; and
an insulating layer disposed on a surface of the main body portion,
the main body portion comprising a pair of first faces which are opposite to each other in a laminating direction of the main body portion, a pair of first side faces which are opposite to each other and a pair of second side faces which are opposite to each other, the pair of first side faces and the pair of second side faces connecting the pair of first faces,
the external electrodes being disposed on the first side faces, respectively,
when a positional direction of the first side faces is defined as a first direction, and a positional direction of the second side faces is defined as a second direction,
the metal films each having a plurality of first segments into which the metal films are divided by a plurality of first grooves extending in the first direction,
when an interval between two grooves of the plurality of first grooves which are arranged adjacent to each other and are nearest the second side faces is designated as P, and regions of the first side faces that are distant from the second side faces, respectively, by a distance of less than or equal to P are defined as first regions,
the insulating layer being disposed between the main body portion and parts of the external electrodes within the first regions.

2. The film capacitor according to claim 1,
wherein D2 is greater than D1, in which D1 denotes a distance between the second side faces and the insulating layer, and D2 denotes a distance between the second side faces and the external electrodes of the first side faces.

3. The film capacitor according to claim 1,
wherein a value given as: ((D1+W1)/P) is greater than 1, in which D1 denotes a distance between the second side faces and the insulating layer of the first side faces, and W1 denotes a length in the second direction of the insulating layer.

4. The film capacitor according to claim 3,
wherein the value given as: ((D1+W1)/P) is less than or equal to 3.

5. The film capacitor according to claim 1,
wherein an average thickness of the insulating layer is greater than or equal to 3 μm.

6. The film capacitor according to claim 1,
wherein the first segments comprises a plurality of sub-segments as second segments, of which adjacent second segments are electrically connected to each other via a fuse.

7. A combination type capacitor, comprising:
a plurality of film capacitors; and
at least one bus bar connecting all of the plurality of film capacitors,
the plurality of film capacitors comprising the film capacitor according to claim 1.

8. An inverter, comprising:
a bridge circuit comprising switching elements; and
a capacitance member connected to the bridge circuit, the capacitance member comprising the film capacitor according to claim 1.

9. An electric vehicle, comprising:
a power supply;
the inverter according to claim 8, connected to the power supply;
a motor connected to the inverter; and
wheels driven by the motor.

10. A film capacitor, comprising:
a main body portion shaped in a rectangular prism, comprising dielectric films and metal films which are laminated;
a pair of external electrodes; and
an insulating layer disposed on a surface of the main body portion,
the main body portion comprising a pair of first faces which are opposite to each other in a laminating direction of the main body portion, a pair of first side faces which are opposite to each other and a pair of second side faces which are opposite to each other, the pair of first side faces and the pair of second side faces connecting the pair of first faces,
the external electrodes being disposed on the first side faces, respectively,
when a positional direction of the first side faces is defined as a first direction, and a positional direction of the second side faces is defined as a second direction,
the metal films each having a plurality of first segments into which the metal films are divided by a plurality of first grooves extending in the first direction,
when an interval between two grooves of the plurality of first grooves which are arranged adjacent to each other and are nearest the second side faces, respectively, is designated as P, and regions of the first side faces that are distant from the second side faces, respectively, by a distance of less than or equal to P are defined as first regions,
the insulating layer being disposed at an area of the first side faces spaced away from the second side faces, respectively, by a distance equal to P,
the external electrodes being not disposed in the first regions.

11. The film capacitor according to claim 10,
wherein the first side faces comprise a second region where the insulating layer and the external electrode overlap with each other, and
the insulating layer is disposed between the main body portion and part of external electrode within the second region.

12. The film capacitor according to claim 10,
wherein the insulating layer is apart from the external electrodes.

13. The film capacitor according to claim 10,
wherein a value given as: ((D1+W1)/P) is greater than 1, in which D1 denotes a distance between the second side faces and the insulating layer of the first side faces, and W1 denotes a length in the second direction of the insulating layer.

14. The film capacitor according to claim 13,
wherein the value given as: ((D1+W1)/P) is less than or equal to 3.

15. The film capacitor according to claim 10,
wherein an average thickness of the insulating layer is greater than or equal to 3 μm.

16. The film capacitor according to claim 10,
wherein the first segments comprises a plurality of sub-segments as second segments, of which adjacent second segments are electrically connected to each other via a fuse.

17. A combination type capacitor, comprising:
a plurality of film capacitors; and
at least one bus bar connecting all of the plurality of film capacitors,
the plurality of film capacitors comprising the film capacitor according to claim 10.

18. An inverter, comprising:
a bridge circuit comprising switching elements; and
a capacitance member connected to the bridge circuit,
the capacitance member comprising the film capacitor according to claim 10.

19. An electric vehicle, comprising:
a power supply;
the inverter according to claim 18, connected to the power supply;
a motor connected to the inverter; and
wheels driven by the motor.

\* \* \* \* \*